US011829554B2

(12) United States Patent
Park et al.

(10) Patent No.: US 11,829,554 B2
(45) Date of Patent: Nov. 28, 2023

(54) FINGERPRINT SENSOR DEVICE, DISPLAY DEVICE INCLUDING THE SAME, AND METHOD FOR DRIVING THE DISPLAY DEVICE

(71) Applicant: SAMSUNG DISPLAY CO., LTD., Yongin-si (KR)

(72) Inventors: Kyung Tea Park, Seoul (KR); Hyun Dae Lee, Hwaseong-si (KR); Kang Bin Jo, Suwon-si (KR); Jong Hyun Lee, Suwon-si (KR)

(73) Assignee: SAMSUNG DISPLAY CO., LTD., Suwon-si (KR)

( * ) Notice: Subject to any disclaimer, the term of this patent is extended or adjusted under 35 U.S.C. 154(b) by 0 days.

(21) Appl. No.: 17/453,936

(22) Filed: Nov. 8, 2021

(65) Prior Publication Data

US 2022/0317852 A1 Oct. 6, 2022

(30) Foreign Application Priority Data

Apr. 1, 2021 (KR) .................. 10-2021-0042480

(51) Int. Cl.
*G06F 1/03* (2006.01)
*G06V 40/13* (2022.01)
(Continued)

(52) U.S. Cl.
CPC ........ *G06F 3/04166* (2019.05); *G06F 3/0443* (2019.05); *G06F 3/0448* (2019.05); *G06V 40/1306* (2022.01)

(58) Field of Classification Search
CPC .. G06F 3/04166; G06F 3/0443; G06F 3/0448; G06V 40/1306
See application file for complete search history.

(56) References Cited

U.S. PATENT DOCUMENTS

2014/0333328 A1\* 11/2014 Nelson ................. G06F 3/0416
324/663
2018/0164943 A1\* 6/2018 Hung .................. G06F 3/04166
(Continued)

FOREIGN PATENT DOCUMENTS

KR 10-2017-0040825 4/2017
KR 10-2019-0033235 3/2019
(Continued)

*Primary Examiner* — Amit Chatly
(74) *Attorney, Agent, or Firm* — F. Chau & Associates, LLC

(57) ABSTRACT

A display device includes a display panel including a plurality of touch electrodes, a touch driving circuit electrically connected to the plurality of touch electrodes, and a fingerprint sensor device disposed on one surface of the display panel and including a plurality of unit blocks. The fingerprint sensor device includes a plurality of fingerprint scan lines extending in a first direction, a plurality of fingerprint sensing lines extending in a second direction crossing the first direction, a plurality of sensor pixels respectively connected to the plurality of fingerprint scan lines and the plurality of fingerprint sensing lines, and a fingerprint scan driver having a plurality of stages for applying a fingerprint scan signal to each of the plurality of fingerprint scan lines. The touch driving circuit applies a start signal to the fingerprint scan driver.

22 Claims, 19 Drawing Sheets

(51) Int. Cl.
  *G06F 3/044* (2006.01)
  *G06F 3/041* (2006.01)

(56) References Cited

U.S. PATENT DOCUMENTS

| | | | |
|---|---|---|---|
| 2021/0072854 A1* | 3/2021 | Kuo | G09G 3/2092 |
| 2021/0109639 A1* | 4/2021 | Hsieh | G06F 3/0412 |
| 2022/0012454 A1* | 1/2022 | Lin | G06F 3/0446 |
| 2022/0050984 A1 | 2/2022 | Park et al. | |
| 2022/0101648 A1* | 3/2022 | Blanchon | G06V 40/1347 |
| 2022/0276758 A1* | 9/2022 | Pallerla | G06F 1/3218 |

FOREIGN PATENT DOCUMENTS

| | | |
|---|---|---|
| KR | 10-2019-0047790 | 5/2019 |
| KR | 10-2020-0001298 | 1/2020 |

* cited by examiner

FIG. 15

FINGERPRINT SENSOR DEVICE, DISPLAY DEVICE INCLUDING THE SAME, AND METHOD FOR DRIVING THE DISPLAY DEVICE

CROSS-REFERENCE TO RELATED APPLICATION

This non-provisional patent application claims priority under 35 U.S.C. § 119 to Korean Patent Application No. 10-2021-0042480, filed on Apr. 1, 2021, the disclosure of which is incorporated by reference in its entirety herein.

1. TECHNICAL FIELD

Embodiments of the present disclosure relate to a fingerprint sensor device, a display device including the same, and a method for driving the display device.

2. DISCUSSION OF RELATED ART

A display device is applied to various electronic devices such as a smartphone, a tablet, a notebook computer, a monitor, and a television (TV). With the recent advance of mobile communication technology, the use of portable electronic devices such as a smartphone, a tablet, and a notebook computer has increased enormously. Privacy information is stored in the portable electronic device. Fingerprint authentication may be used to authenticate a user to gain access to the corresponding privacy information. A display device may include a fingerprint sensor device to perform the fingerprint authentication.

When the area of the fingerprint sensor device is increased, the number of sensor pixels is increased by the increased area, so that the number of pads of the fingerprint sensor device connected to a fingerprint driving circuit is increased. When the number of pads of the fingerprint sensor device is increased, the area is increased due to an increase in a number of bumps of the fingerprint driving circuit. Thus, the manufacturing cost of the fingerprint driving circuit may be increased.

SUMMARY

An embodiment of the present disclosure may provide a fingerprint sensor device including a fingerprint driving circuit with a reduced number of bumps.

An embodiment of the present disclosure may also provide a display device including a fingerprint driving circuit with a reduced number of bumps.

An embodiment of the present disclosure may also provide a method for driving a display device including a fingerprint driving circuit with a reduced number of bumps.

According to an embodiment of the present disclosure, a display device includes a display panel including a plurality of touch electrodes, a touch driving circuit electrically connected to the plurality of touch electrodes, and a fingerprint sensor device disposed on one surface of the display panel and including a plurality of unit blocks. The fingerprint sensor device includes a plurality of fingerprint scan lines extending in a first direction, a plurality of fingerprint sensing lines extending in a second direction crossing the first direction, a plurality of sensor pixels respectively connected to the plurality of fingerprint scan lines and the plurality of fingerprint sensing lines, and a fingerprint scan driver having a plurality of stages for applying a fingerprint scan signal to each of the plurality of fingerprint scan lines. The touch driving circuit applies a start signal to the fingerprint scan driver.

In an embodiment, a magnitude of a pulse of the start signal may be equal to a magnitude of a pulse of a touch driving signal applied to the plurality of touch electrodes.

In an embodiment, the pulse of the touch driving signal may rise from a first level voltage to a second level voltage, and the pulse of the start signal may fall from the second level voltage to the first level voltage.

In an embodiment, the touch driving circuit may calculate touch coordinates using the plurality of touch electrodes, and may set a fingerprint sensor block including some unit blocks among the plurality of unit blocks based on the touch coordinates.

In an embodiment, the touch driving circuit may apply the start signal to a start stage among the plurality of stages.

In an embodiment, the display device may further include a demultiplexer disposed between the touch driving circuit and the fingerprint scan driver, and a plurality of start lines respectively connected to start stages of the plurality of unit blocks. The demultiplexer may apply the start signal to one of the plurality of start lines in response to a demultiplexer control signal of the touch driving circuit.

In an embodiment, the display device may further include a fingerprint driving circuit configured to convert sensing voltages of the sensor pixels into fingerprint sensing data of a digital format.

In an embodiment, the display device may further include a main processor configured to receive the fingerprint sensing data of the fingerprint driving circuit to authenticate a fingerprint of a user.

In an embodiment, the fingerprint sensor device may further include a multiplexer disposed between the plurality of fingerprint sensing lines and the fingerprint driving circuit. The multiplexer may connect at least two fingerprint sensing lines among the plurality of fingerprint sensing lines to one pad line connected to the fingerprint driving circuit.

In an embodiment, the multiplexer includes a first multiplexer transistor configured to connect a first fingerprint sensing line among the at least two fingerprint sensing lines to the pad line in response to a first multiplexer control signal, a second multiplexer transistor configured to connect a second fingerprint sensing line among the at least two fingerprint sensing lines to the pad line in response to a second multiplexer control signal, a third multiplexer transistor configured to connect a third fingerprint sensing line among the at least two fingerprint sensing lines to the pad line in response to a third multiplexer control signal, and a fourth multiplexer transistor configured to connect a fourth fingerprint sensing line among the at least two fingerprint sensing lines to the pad line in response to a fourth multiplexer control signal.

In an embodiment, each of the plurality of stages may include a start terminal to which the start signal or a carry signal is input, a first clock terminal to which one of a first clock signal of a first clock line and a second clock signal of a second clock line is input and a second clock terminal to which the other one of the first clock signal and the second clock signal is input, and an output terminal configured to output the fingerprint scan signal.

In an embodiment, the fingerprint scan signal includes a first pulse overlapping one of pulses of the first multiplexer control signal, a second pulse overlapping one of pulses of the second multiplexer control signal, a third pulse overlapping one of pulses of the third multiplexer control signal, and a fourth pulse overlapping one of pulses of the fourth multiplexer control signal.

In an embodiment, a first width of the first pulse, a second width of the second pulse, a third width of the third pulse, and a fourth width of the fourth pulse may be different.

In an embodiment, the first width may be larger than the second width, the third width, and the fourth width; the second width may be larger than the third width and the fourth width; and the third width may be larger than the fourth width.

In an embodiment, the fingerprint scan signal may further include a dummy pulse that does not overlap pulses of the first multiplexer control signal, pulses of the second multiplexer control signal, pulses of the third multiplexer control signal, and pulses of the fourth multiplexer control signal.

According to an embodiment of the present disclosure, a fingerprint sensor device includes a plurality of fingerprint scan lines extending in a first direction, a plurality of fingerprint sensing lines extending in a second direction crossing the first direction, a plurality of sensor pixels respectively connected to the plurality of fingerprint scan lines and the plurality of fingerprint sensing lines, a fingerprint scan driver having a plurality of stages for applying a fingerprint scan signal to each of the plurality of fingerprint scan lines, and a multiplexer including N multiplexer transistors for connected N fingerprint sensing lines among the plurality of fingerprint sensing lines to one pad line. The N multiplexer transistors are controlled by N multiplexer control signals. The fingerprint scan signal includes N pulses overlapping pulses of the N multiplexer control signals.

In an embodiment, widths of the N pulses of the fingerprint scan signal may be different from each other.

In an embodiment, the fingerprint scan signal may further include a dummy pulse that does not overlap the pulses of the N multiplexer control signals.

According to an embodiment of the present disclosure, a method for driving a display device includes calculating touch coordinates by applying a touch driving signal to a plurality of touch electrodes, applying a fingerprint scan signal to sensor pixels of a fingerprint sensor block including some unit blocks among a plurality of unit blocks of a fingerprint sensor device based on the touch coordinates, converting sensing signals of the sensor pixels into fingerprint sensing data having a digital format, and authenticating a fingerprint of a user by comparing a fingerprint pattern generated by the fingerprint sensing data with a pre-stored fingerprint pattern. The applying of the fingerprint scan signal includes applying a start signal to a start stage of the fingerprint sensor block, where a magnitude of a pulse of the start signal is equal to a magnitude of a pulse of the touch driving signal.

In an embodiment, the pulse of the touch driving signal may rise from a first level voltage to a second level voltage, and the pulse of the start signal may fall from the second level voltage to the first level voltage.

According to an embodiment of the present disclosure, a display device includes a display panel having a plurality of touch electrodes, a fingerprint sensor device disposed on one surface of the display panel, a touch driving circuit electrically connected to the plurality of touch electrodes, a plurality of fingerprint scan lines extending in a first direction, a plurality of fingerprint sensing lines extending in a second direction crossing the first direction, a plurality of sensor pixels respectively connected to the plurality of fingerprint scan lines and the plurality of fingerprint sensing lines, a fingerprint scan driver having a plurality of stages for applying a fingerprint scan signal to each of the plurality of fingerprint scan lines, and a demultiplexer, where the touch driving circuit applies a start signal to a start stage among the plurality of stages through the demultiplexer.

In an embodiment, an output of the demultiplexer may be directly connected to a start terminal of the start stage.

In an embodiment, an output of the start stage is connected to a first one of the fingerprint scan lines.

BRIEF DESCRIPTION OF THE DRAWINGS

The above and other features of the present disclosure will become more apparent by describing in detail embodiments thereof, with reference to the accompanying drawings, in which:

FIG. 15 illustrates a reset period, a light exposure period, and a readout period of a fingerprint sensor device according to an embodiment of the disclosure;

DETAILED DESCRIPTION OF THE EMBODIMENTS

Figure 1:
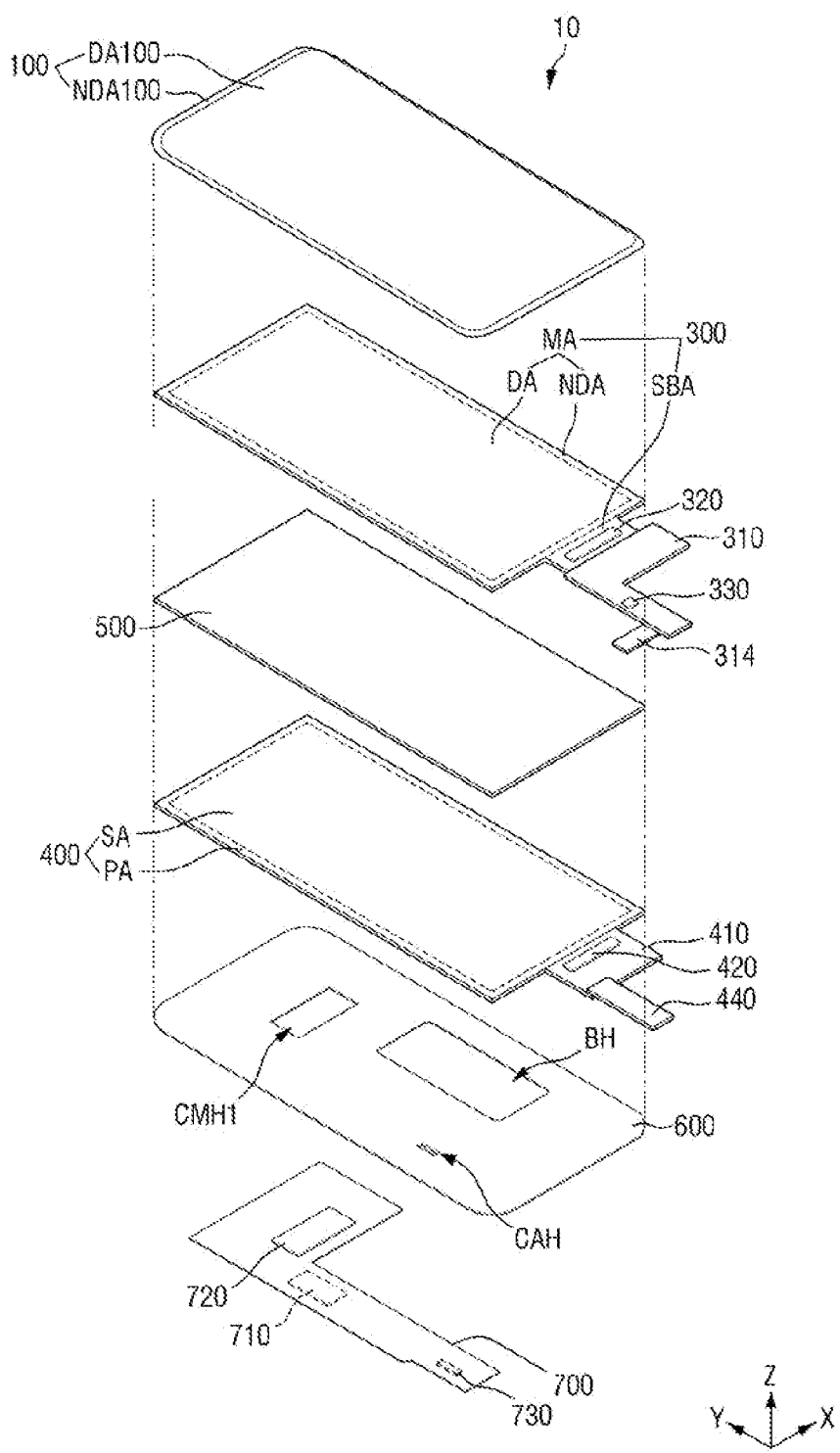
FIG. 1 is an exploded perspective view showing a display device according to an embodiment of the disclosure.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

FIG. 1 is an exploded perspective view showing a display device according to an embodiment of the disclosure.

Referring to FIG. 1, a display device 10 according to an embodiment may be applied to portable electronic devices such as a mobile phone, a smartphone, a tablet personal computer, a mobile communication terminal, an electronic organizer, an electronic book, a portable multimedia player (PMP), a navigation system, an ultra mobile PC (UMPC) or the like. Alternatively, the display device 10 according to an embodiment may be applied as a display unit of a television, a laptop, a monitor, a billboard, or an Internet-of-Things (IoT) terminal. Alternatively, the display device 10 according to an embodiment may be applied to wearable devices such as a smart watch, a watch phone, a glasses type display, or a head mounted display (HMD). Alternatively, the display device 10 according to an embodiment may be applied to a dashboard of a vehicle, a center fascia of a vehicle, a center information display (CID) disposed on a dashboard of a vehicle, a room mirror display in place of side mirrors of a vehicle, or a display disposed on a rear surface of a front seat for rear seat entertainment of a vehicle.

In the present disclosure, a first direction (X-axis direction) may be a short side direction of a display panel 300, for example, a horizontal direction of the display panel 300. A second direction (Y-axis direction) may be a long side direction of the display panel 300, for example, a vertical direction of the display panel 300. A third direction (Z-axis direction) may be a thickness direction of the display panel 300.

The display device 10 according to an embodiment includes a cover window 100, a display panel 300, a display circuit board 310, a display driving circuit 320, a fingerprint sensor device 400, a fingerprint circuit board 410, a fingerprint driving circuit 420, a bracket 600, and a main circuit board 700.

The cover window 100 may be disposed above the display panel 300 to cover the front surface of the display panel 300. Accordingly, the cover window 100 may function to protect the front surface of the display panel 300.

The cover window 100 may include a light transmitting portion DA100 corresponding to the display panel 300 and a light blocking portion NDA100 corresponding to an area other than the display panel 300. The light blocking portion NDA100 may be formed to be opaque. Alternatively, the light blocking portion NDA100 may be formed as a decorative layer having a pattern that can be displayed to the user when an image is not displayed.

The display panel 300 may be disposed below the cover window 100. The display panel 300 may be a light emitting display panel including a light emitting element. For example, the display panel 300 may be an organic light emitting display panel using an organic light emitting diode (LED) including an organic light emitting layer, a micro LED display panel using a micro LED, a quantum dot light emitting display panel using a quantum dot LED including a quantum dot light emitting layer, or an inorganic light emitting display panel using an inorganic light emitting element including an inorganic semiconductor. The following description is directed to an embodiment where the display panel 300 is an organic light emitting display panel.

The display panel 300 includes a main region MA and a sub-region SBA. The main region MA includes a display area DA displaying an image and a non-display area NDA that is a peripheral area of the display area DA. The display area DA may include pixels PX (see FIG. 5) for displaying an image. The non-display area NDA may be defined as an area from the boundary of the display area DA to the edge of the display panel 300.

The sub-region SBA may protrude in the second direction (Y-axis direction) from one side of the main region MA. The length of the sub-region SBA in the first direction (X-axis direction) may be smaller than the length of the main region MA in the first direction (X-axis direction), and the length of the sub-region SBA in the second direction (Y-axis direction) may be smaller than the length of the main region MA in the second direction (Y-axis direction), but the present disclosure is not limited thereto.

Although it is exemplarily shown in FIG. 1 that the sub-region SBA is unfolded, the sub-region SBA may be bent and, in this case, arranged on the bottom surface of the display panel 300. In an embodiment where the sub-region SBA is bent, it may overlap the main region MA in the thickness direction (Z-axis direction) of the substrate SUB. The display circuit board 310 and the display driving circuit 320 may be disposed in the sub-region SBA.

The display circuit board 310 may be attached to one end of the sub-region SBA of the display panel 300 with a conductive adhesive member such as an anisotropic conductive film. As a consequence, the display circuit board 310 may be electrically connected to the display panel 300 and the display driving circuit 320. The display circuit board 310 may be a flexible printed circuit board, a printed circuit board, or a flexible film such as a chip on film.

The display driving circuit 320 may generate signals and voltages for driving the display panel 300. The display driving circuit 320 may be formed as an integrated circuit (IC) and attached to the sub-region SBA of the display panel 300 by a chip on glass (COG) method, or a chip on plastic (COP) method, but the present disclosure is not limited thereto. For example, the display driving circuit 320 may be attached to the display circuit board 310 by a chip on film (COF) method.

A touch driving circuit 330 may be disposed on the display circuit board 310. The touch driving circuit 330 may be formed as an integrated circuit and attached to the top surface of the display circuit board 310.

The touch driving circuit 330 may be electrically connected to touch electrodes of a touch electrode layer of the display panel 300 through the display circuit board 310. The display panel 300 may include the touch electrode layer having touch electrodes for sensing an object such as a human finger, a pen, a stylus or the like. The touch driving circuit 330 may output touch driving signals to driving electrodes among the touch electrodes, and use sensing electrodes among the touch electrodes to sense a charge variation amount of a capacitance in each driving electrode and each sensing electrode.

The touch driving circuit 330 may generate touch data based on the sensed charge variation amount of the capacitance, and analyze the touch data to calculate touch coordinates where the touch occurs. The touch may include a contact touch and a proximity touch. The contact touch indicates that the object such as the human finger or pen makes a direct contact with the cover window disposed above the touch electrode layer. The proximity touch indicates that the object such as the human finger or pen is positioned above the cover window to be proximately apart therefrom, such as hovering.

Further, a power supply unit (e.g., a power supply) may be additionally disposed on the display circuit board 310 to supply display driving voltages for driving the display driving circuit 320.

The fingerprint sensor device 400 may be disposed on the bottom surface of the display panel 300. The fingerprint sensor device 400 may be attached to the bottom surface of the display panel 300 using a transparent adhesive member. For example, the transparent adhesive member may be a transparent adhesive film such as an optically clear adhesive (OCA) film or a transparent adhesive resin such as an optically clear resin (OCR).

The fingerprint sensor device 400 may include sensor pixels for sensing light and sensing a user's fingerprint on the cover window 100. The fingerprint sensor device 400 may include a sensor area SA where the sensor pixels are arranged and a peripheral area PA where the sensor pixels are not arranged. The sensor area SA may overlap the display area DA of the display panel 300 in the third direction (Z-axis direction). The peripheral area PA may overlap the non-display area NDA of the display panel 300 in the third direction (Z-axis direction).

The fingerprint circuit board 410 may be attached to one end of the fingerprint sensor device 400 using a conductive adhesive member such as an anisotropic conductive film. Accordingly, the fingerprint circuit board 410 may be electrically connected to the fingerprint sensor device 400. The fingerprint circuit board 410 may be a flexible printed circuit board, a printed circuit board, or a flexible film such as a chip-on film.

The fingerprint driving circuit 420 may be electrically connected to a fingerprint scan driver, a fingerprint reset driver, and sensor pixels of the fingerprint sensor device 400 through the fingerprint circuit board 410. The fingerprint driving circuit 420 may apply driving voltages to the fingerprint scan driver and the fingerprint reset driver and sense the sensing voltages of the sensor pixels. The sensor pixels may output the sensing voltages in response to the amount of incident light. The fingerprint driving circuit 420 may convert the sensing voltages of the sensor pixels into fingerprint sensing data that is digital data.

A connection circuit board 440 may connect the display circuit board 310 to the fingerprint circuit board 410. One end of the connection circuit board 440 may be connected to the fingerprint circuit board 410, and the other end of the connection circuit board 440 may be connected to the display circuit board 310. Accordingly, the fingerprint circuit board 410 may be electrically connected to the main circuit board 700 as well as the display circuit board 310. Therefore, the fingerprint sensing data of the fingerprint driving circuit 420 may be transmitted to a main processor 710 of the main circuit board 700. The main processor 710 may authenticate a user's fingerprint by comparing the fingerprint pattern generated by the fingerprint sensing data with a pre-stored fingerprint pattern.

The bracket 600 may be disposed under the display panel 300. The bracket 600 may include plastic, metal, or both plastic and metal. A cable hole CAH through which a cable 314 connected to the display circuit board 310 passes may be formed in the bracket 600.

The main circuit board 700 may be disposed under the bracket 600. The main circuit board 700 may be a printed circuit board or a flexible printed circuit board.

The main circuit board 700 may include a main processor 710 and a main connector 730. The main processor 710 and the main connector 730 may be arranged on the bottom surface of the main circuit board 700.

The main processor 710 may control all functions of the display device 10. For example, the main processor 710 may output digital video data to the display driving circuit 320 through the display circuit board 310 such that the display panel 300 displays an image. Further, the main processor 710 may receive touch coordinate data from the touch driving circuit 330 and determine the user's touch coordinates, and then execute an application indicated by an icon displayed on the user's touch coordinates.

The cable 314 having passed through the cable hole CAH of the bracket 600 may be connected to the main connector 730. Thus, the main circuit board 700 may be electrically connected to the display circuit board 310.

In addition, the main circuit board 700 may be further equipped with a mobile communication module (e.g., a transceiver) capable of transmitting and receiving radio signals with at least one of a base station, an external terminal, and a server in a mobile communication network. The radio signal may include various types of data according to transmission and reception of a voice signal, a video call signal, or a text/multimedia message.

Figure 2:
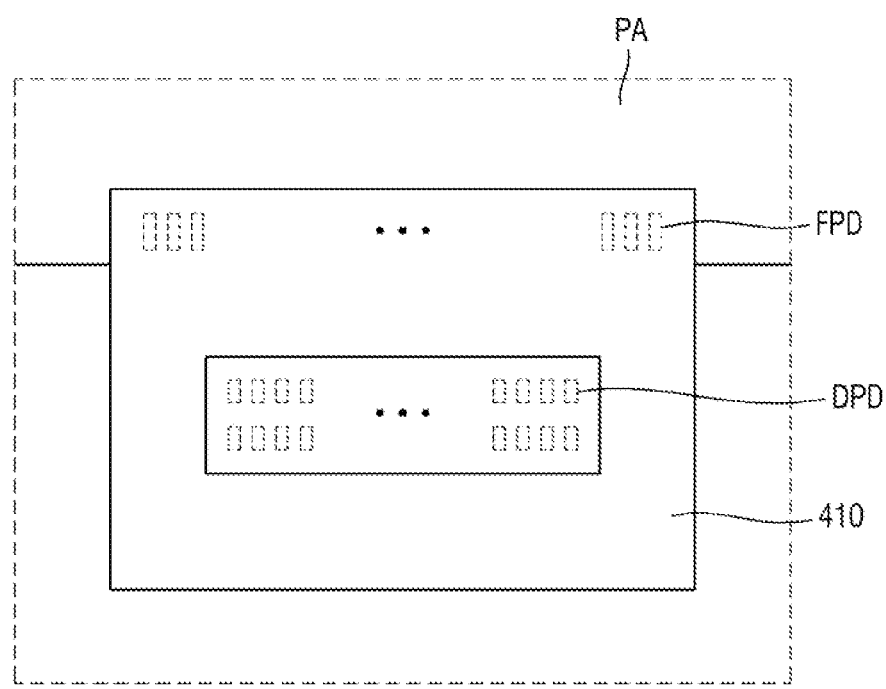
FIG. 2 illustrates fingerprint pads of the fingerprint sensor device, circuit pads of the fingerprint circuit board, and the fingerprint driving circuit shown in FIG. 1.

FIG. 2 illustrates fingerprint pads of the fingerprint sensor device, circuit pads of the fingerprint circuit board, and the fingerprint driving circuit shown in FIG. 1.

Referring to FIG. 2, fingerprint pads FPD may be arranged on one side of the fingerprint sensor device 400. The fingerprint pads FPD may be arranged in the peripheral area PA of the fingerprint sensor device 400. Bumps of the fingerprint circuit board 410 may be arranged on the fingerprint pads FPD. A conductive adhesive member such as an anisotropic conductive film may be disposed between the fingerprint pads FPD and the bumps of the fingerprint circuit board 410. The fingerprint pads FPD and the bumps of the fingerprint circuit board 410 may be connected one-to-one. Therefore, the fingerprint pads FPD may be electrically connected to the bumps of the fingerprint circuit board 410, respectively. In an embodiment, the bumps are made of a conductive material.

The fingerprint circuit board 410 may include driving pads DPD arranged on a top surface thereof. Bumps of the fingerprint driving circuit 420 may be arranged on the driving pads DPD. A conductive adhesive member such as an anisotropic conductive film may be disposed between the driving pads DPD and the bumps of the fingerprint driving circuit 420. The driving pads DPD and the bumps of the fingerprint driving circuit 420 may be connected one-to-one. Therefore, the driving pads DPD may be electrically connected to the bumps of the fingerprint driving circuit 420, respectively.

When the area of the sensor area SA of the fingerprint sensor device 400 is equal to the area of the display area DA of the display panel 300, it is possible to sense a fingerprint in any region of the display device 10. However, since the number of the sensor pixels of the fingerprint sensor device 400 is increased, the number of the fingerprint pads FPD and the number of the driving pads DPD electrically connected to the sensor pixels may be increased. When the number of the driving pads DPD is increased, the number of bumps of the fingerprint driving circuit 420 is increased, which may increase the cost of manufacturing the fingerprint driving circuit 420. The manufacturing cost of the fingerprint driving circuit 420 may be reduced by reducing the area of the fingerprint driving circuit 420. For example, the read may be reduced by reducing the number of bumps of the fingerprint driving circuit 420 although the area of the fingerprint sensor device 400 is increased.

Figure 3:
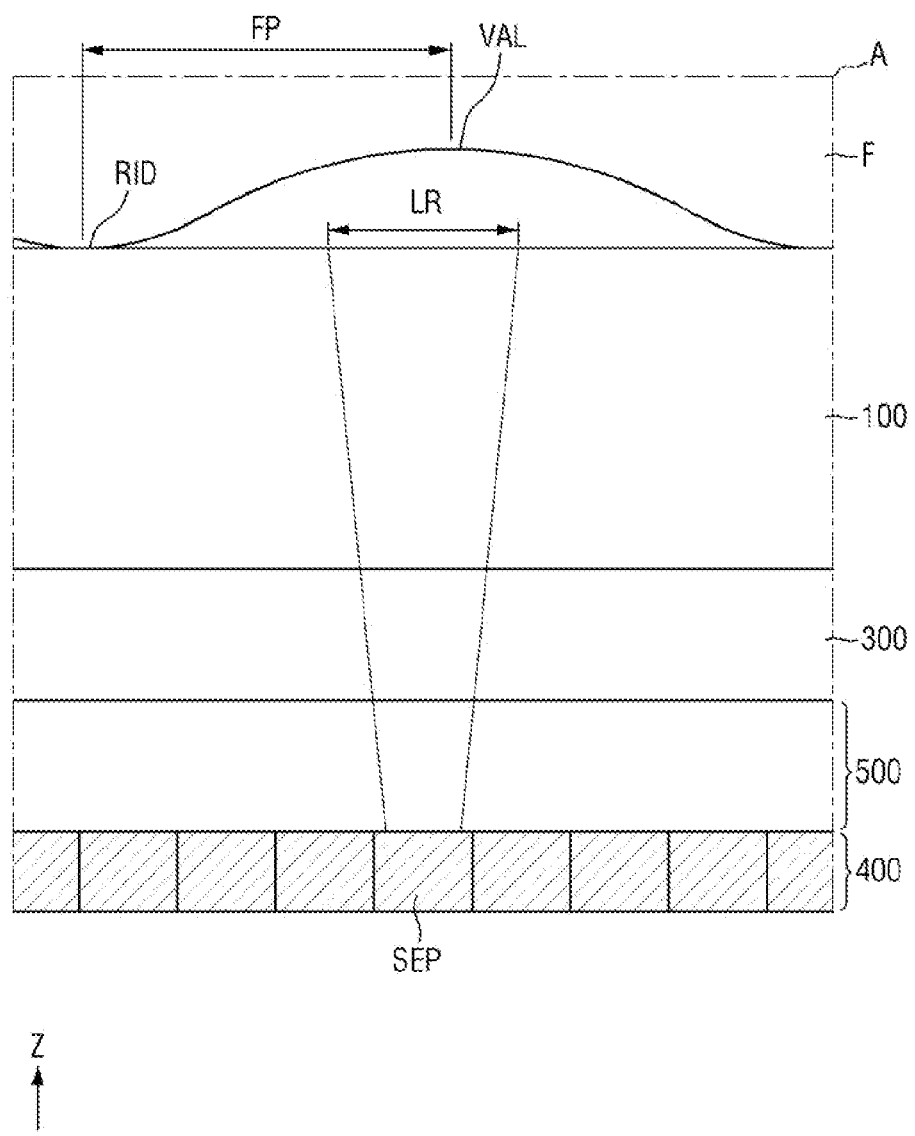
FIG. 3 illustrates fingerprint sensing of a display device according to an embodiment of the disclosure.

FIG. 3 illustrates fingerprint sensing of a display device according to an embodiment of the disclosure. FIG. 3 shows an exemplary situation where a user placed a finger F on the cover window 100 of the display device 10 for fingerprint authentication.

Referring to FIG. 3, the display device 10 may further include a light guide unit 500 of the fingerprint sensor device 400. The light guide unit 500 may include a lens array including a convex lens that is upwardly convex, a collimator including a plurality of light transmitting portions and a light blocking portion, or a pin hole array including a plurality of pin holes to provide or guide light to each of sensor pixels SEP. Alternatively, the light guide unit 500 may be a combination of at least two of the lens array, the collimator, and the pin hole array.

Although FIG. 3 illustrates that the light guide unit 500 is formed separately from the display panel 300, embodiments of the disclosure are not limited thereto. The light guide unit 500 may be included in the display panel 300.

Specifically, when the user's finger F is in contact with the cover window 100, the light outputted from the display panel 300 may be reflected by a ridge RID and a valley VAL of the fingerprint of the finger F. The amount of light reflected by a ridge RID of a fingerprint of a finger F and the amount of light reflected by a valley VAL of the fingerprint of the finger F may be different.

A range LR of the light incident on the sensor pixel SEP through the light guide unit 500 may be shorter than a distance FP between the ridge RID and the valley VAL of the fingerprint of the finger F. Since the amount of light reflected by the ridge RID of the fingerprint of the finger F and the amount of light reflected by the valley VAL of the fingerprint of the finger F are different, the sensing current flowing through a photodetector of each of the sensor pixels SEP may be different depending on whether the light is reflected by the ridge RID of the fingerprint of the finger F or by the valley VAL of the fingerprint of the finger F. Therefore, the sensing voltages outputted from the sensor pixels SEP may be different depending on whether the light is reflected by the ridge RID of the fingerprint of the finger F or by the valley VAL of the fingerprint of the finger F.

The fingerprint driving circuit 420 may convert the sensing voltages of the sensor pixels SEP into the fingerprint sensing data that is digital data and transmit it to the main processor 710. The main processor 710 may generate a fingerprint pattern of the finger F based on the fingerprint sensing data, and authenticate a user's fingerprint by comparing the generated fingerprint pattern with a pre-stored fingerprint pattern.

Figure 4:
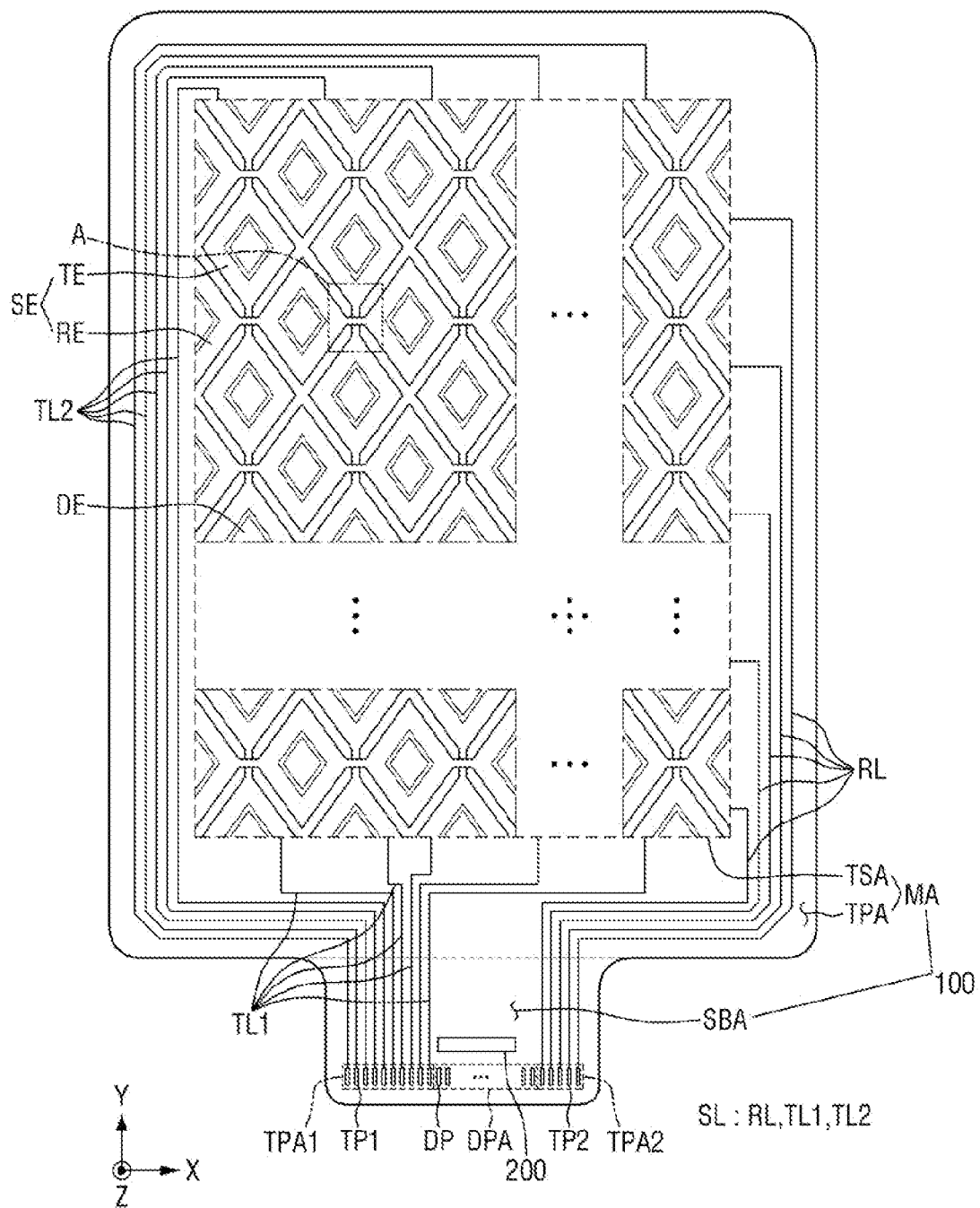
FIG. 4 is a layout diagram showing in detail a touch sensing layer of a display device according to an embodiment of the disclosure.

FIG. 4 is a layout diagram showing in detail a touch sensing layer of a display device according to an embodiment of the disclosure.

FIG. 4 mainly describes an embodiment where the touch sensing layer TSL includes two types of sensor electrodes SE, e.g., driving electrodes TE and sensing electrodes RE, and is driven in a mutual capacitance manner in which touch driving signals are applied to the driving electrodes TE and, then, the charge variation amount of the mutual capacitance of each of a plurality of touch nodes TN is sensed through the sensing electrodes RE.

For simplicity of description, FIG. 4 illustrates only the driving electrodes TE, the sensing electrodes RE, dummy patterns DE, touch lines SL (e.g., TL1, TL2, and RL), and touch pads TP1 and TP2.

Referring to FIG. 4, the touch sensing layer TSL includes a touch sensing area TSA for sensing a user's touch and a touch peripheral area TPA disposed around the touch sensing area TSA. The touch sensing area TSA may overlap the display area DA (see FIG. 1), and the touch peripheral area TPA may overlap the non-display area NDA (see FIG. 1).

The touch sensing area TSA includes the driving electrodes TE, the sensing electrodes RE, and the dummy patterns DE. The driving electrodes TE and the sensing electrodes RE may be electrodes that generate the mutual capacitance to sense touch of an object or a person.

The sensing electrodes RE may arranged side by side in the first direction (X-axis direction) and the second direction (Y-axis direction). The sensing electrodes RE may be electrically connected in the first direction (X-axis direction). The sensing electrodes RE adjacent in the first direction (X-axis direction) may be connected to each other. The sensing electrodes RE adjacent in the second direction (Y-axis direction) may be electrically separated from each other. Accordingly, the touch node TN where the mutual capacitance is generated may be disposed at each of intersections between the driving electrodes TE and the sensing electrodes RE. The plurality of touch nodes TN may correspond to the intersections between the driving electrodes TE and the sensing electrodes RE.

Figure 5:
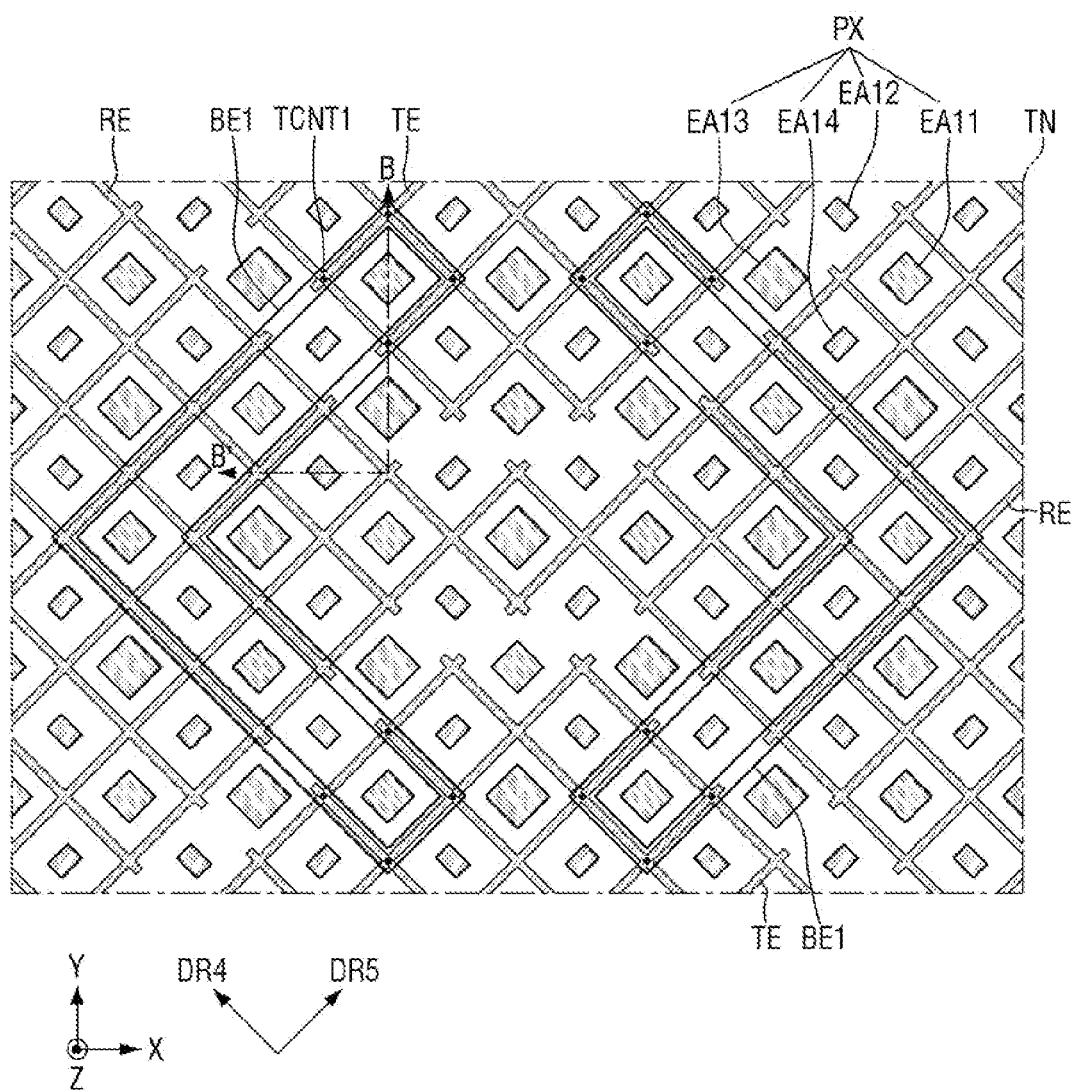
FIG. 5 is a layout diagram showing an example of a touch node of FIG. 4 according to an embodiment of the disclosure.

The driving electrodes TE may be arranged side by side in the first direction (X-axis direction) and the second direction (Y-axis direction). The driving electrode TE adjacent in the first direction (X-axis direction) may be electrically separated from each other. The driving electrodes TE may be electrically connected in the second direction (Y-axis direction). For example, the driving electrodes TE adjacent in the second direction (Y-axis direction) may be connected to each other through a first connection electrode BE1 as shown in FIG. 5.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart from the driving electrode TE or the sensing electrode RE. In an embodiment, each of the dummy patterns DE is electrically floated.

Although FIG. 4 illustrates that each of the driving electrodes TE, the sensing electrodes RE, and the dummy patterns DE has a rhombus planar shape, embodiments of the disclosure are not limited thereto. For example, each of the driving electrodes TE, the sensing electrodes RE, and the dummy patterns DE may have a quadrilateral shape other than a rhombus shape, a polygonal shape other than a quadrilateral shape, a circular shape, or an elliptical shape in plan view.

The touch lines TL1, TL2, and RL may be arranged in the sensor peripheral area TPA. The touch lines TL1, TL2, and RL include touch sensing lines RL connected to the sensing electrodes RE, and first touch driving lines TL1 and second touch driving lines TL2 connected to the driving electrodes TE.

The sensing electrodes RE arranged at one side of the touch sensing area TSA may be connected one-to-one to the touch sensing lines RL. For example, as shown in FIG. 4, the sensing electrode RE disposed at a right end among the sensing electrodes RE electrically connected in the first direction (X-axis direction) may be connected to the touch sensing line RE. The touch sensing lines RL may be connected one-to-one to the second touch pads TP2. Therefore, the touch driving circuit 330 may be electrically connected to the sensing electrodes RE.

The driving electrodes TE arranged at one side of the touch sensing area TSA may be connected one-to-one to the first touch driving lines TL1, and the driving electrodes TE arranged at the other side of the touch sensing area TSA may be connected one-to-one to the second touch driving lines TL2. For example, as shown in FIG. 4, the driving electrode TE disposed at a lower end among the driving electrodes TE electrically connected in the second direction (Y-axis direction) may be connected to the first touch driving line TL1, and the driving electrode TE disposed at an upper end may be connected to the second touch driving line TL2. The second touch driving lines TL2 may be connected to the driving electrodes TE on the upper side of the touch sensing area TSA via the left outer side of the touch sensing area TSA.

The first touch driving lines TL1 and the second touch driving lines TL2 may be connected one-to-one to the first touch pads TP1. Therefore, the touch driving circuit 330 may be electrically connected to the driving electrodes TE. Since the driving electrodes TE are connected to the driving lines TL1 and TL2 at both sides of the touch sensing area TSA and receive the touch driving signals, it is possible to prevent a difference between the touch driving signal applied to the driving electrodes TE arranged on the lower side of the touch sensing area TSA and the touch driving signal applied to the driving electrodes TE arranged on the upper side of the touch sensing area TSA due to a resistance-capacitance (RC) delay of the touch driving signal. The difference may refer to a voltage difference between a touch driving signal applied to an upper driving electrode TE and a touch driving signal applied to a lower driving electrode lower TE.

A first touch pad area TPA1 where the first touch pads TP1 are arranged may be disposed at one side of the display pad area DPA where the display pads DPD are arranged. A second touchpad area TPA2 where the second touch pads TP2 are arranged may be disposed at the other side of the display pad area DPA. The display pads DPD may be electrically connected to data lines of the display panel 300.

The display pad area DPA, the first touch pad area TPA1, and the second touch pad area TPA2 may correspond to the pads of the display panel 300 connected to the display circuit board 310 shown in FIG. 1. The display circuit board 310 may be disposed on the display pads DPD, the first touch pads TP1, and the second touch pads TP2. The display pads DPD, the first touch pads TP1, and the second touch pads TP2 may be electrically connected to the display circuit board 310 through an anisotropic conductive film and a conductive adhesive member. Therefore, the display pads DPD, the first touch pads TP1, and the second touch pads TP2 may be electrically connected to the touch driving circuit 330 disposed on the display circuit board 310.

FIG. 5 is a layout diagram showing an example of the touch node of FIG. 4 in detail according to an embodiment of the disclosure.

Referring to FIG. 5, the touch node TN may be defined at the intersection of the driving electrodes TE and the sensing electrodes RE.

The driving electrodes TE and the sensing electrodes RE are arranged on the same layer while being spaced apart from each other. That is, a gap may be formed between the driving electrode TE and the sensing electrode RE adjacent to each other.

Further, the dummy pattern DE (see FIG. 4) may also be disposed on the same layer as the driving electrodes TE and the sensing electrodes RE. That is, a gap may be formed between the driving electrode TE and the dummy pattern DE (see FIG. 4) adjacent to each other and the sensing electrode RE and the dummy pattern DE (see FIG. 4) adjacent to each other.

The first connection electrodes BE1 may be arranged on a layer different from the driving electrodes TE and the sensing electrodes RE. The first connection electrode BE1 may be bent at least once. FIG. 5 illustrates that the first connection electrode BE1 has an angle bracket shape ("<" or ">"), but the planar shape of the first connection electrode BE1 is not limited thereto. Because the driving electrodes TE adjacent in the second direction (Y-axis direction) are connected via the plurality of first connection electrodes BE1, even if one of the first connection electrodes BE1 is broken, the driving electrodes TE adjacent in the second direction (Y-axis direction) may be stably connected to each other. While FIG. 5 illustrates that the adjacent driving electrodes TE are connected by two first connection electrodes BE1, the number of the first connection electrodes BE1 is not limited thereto.

The first connection electrode BE1 may overlap the driving electrodes TE adjacent in the second direction (Y-axis direction) in the third direction (Z-axis direction) that is the thickness direction of the substrate SUB. The first connection electrode BE1 may overlap the sensing electrode RE in the third direction (Z-axis direction). One side of the first connection electrode BE1 may be connected to any one of the driving electrodes TE adjacent in the second direction (Y-axis direction) through first touch contact holes TCNT1. The other side of the first connection electrode BE1 may be connected to another driving electrode TE among the driving electrodes TE adjacent in the second direction (Y-axis direction) through the first touch contact holes TCNT1.

Due to the plurality of first connection electrodes BE1, the driving electrodes TE and the sensing electrodes RE may be electrically separated at intersections thereof. Accordingly, a mutual capacitance may be generated between the driving electrodes TE and the sensing electrodes RE.

Each of the driving electrodes TE and the sensing electrodes RE may have a shape of a mesh or a net in a plan view. Further, each of the dummy patterns DE (see FIG. 4) may have a shape of a mesh or a net in a plan view. In an embodiment, each of the driving electrodes TE, the sensing electrodes RE, and the dummy patterns DE (see FIG. 4) do not overlap light emitting portions EA11, EA12, EA13, and EA14 of each of pixels PX. In an embodiment, each of the first connection electrodes BE1 do not overlap the light emitting portions EA11, EA12, EA13, and EA14 of each of the pixels PX. Therefore, it is possible to prevent a decrease in the luminance of the light that occurs when the light emitted from the light emitting portions EA11, EA12, EA13, and EA14 is blocked by the driving electrodes TE, the sensing electrodes RE, the first connection electrodes BE1, and the dummy patterns (see FIG. 4).

Each of the pixels PX includes a first light emitting portion EA11 for emitting light of a first color, a second light emitting portion EA12 for emitting light of a second color, a third light emitting portion EA13 for emitting light of a third color, and a fourth light emitting portion EA14 for emitting light of the second color. For example, the first color may be red, the second color may be green, and the third color may be blue. While FIG. 5 illustrates that the second light emitting portion EA12 and the fourth light emitting portion EA14 of the pixel PX emit the light of the same color, embodiments of the disclosure are not limited thereto. That is, the second light emitting portion EA12 and the fourth light emitting portion EA14 of the pixel PX may emit lights of different colors.

The first light emitting portion EA11 and the second light emitting portion EA12 of each of the pixels PX may be adjacent to each other in a fourth direction DR4, and the third light emitting portion EA13 and the fourth light emitting portion EA14 may be adjacent to each other in the fourth direction DR4. The first light emitting portion EA11 and the fourth light emitting portion EA14 of each of the pixels PX may be adjacent to each other in a fifth direction DR5, and the second light emitting portion EA12 and the third light emitting portion EA13 may be adjacent to each other in the fifth direction DR5.

Each of the first light emitting portion EA11, the second light emitting portion EA12, the third light emitting portion EA13, and the fourth light emitting portion EA14 may have a rhombus shape or a rectangular shape in a plan view, but embodiments of the present disclosure are not limited thereto. Each of the first light emitting portion EA11, the second light emitting portion EA12, the third light emitting portion EA13, and the fourth light emitting portion EA14 may have a polygonal shape other than a quadrilateral shape, a circular shape, or an elliptical shape in a plan view. Further, FIG. 5 illustrates that the third light emitting portion EA13 has the largest area and the second light emitting portion EA12 and the fourth light emitting portion EA14 have the smallest area, but embodiments of the present disclosure are not limited thereto.

The second light emitting portions EA12 and the fourth light emitting portions EA14 may be arranged in odd rows. The second light emitting portions EA12 and the fourth light emitting portions EA14 may be arranged in the first direction (X-axis direction) in each of the odd rows. The second light emitting portions EA12 and the fourth light emitting portions EA14 may be arranged alternately in the odd rows. Each of the second light emitting portions EA12 may have a short side in the fourth direction DR4 and a long side in the fifth direction DR5, whereas each of the fourth light emitting portions EA14 may have a long side in the fourth direction DR4 and a short side in the fifth direction DR5. The fourth direction DR4, which is the direction between the first direction (X-axis direction) and the second direction (Y-axis direction), may be inclined by 45 degrees with respect to the first direction (X-axis direction). The fifth direction DR5 may a direction orthogonal to the fourth direction DR4.

The first light emitting portions EA11 and the third light emitting portions EA13 may be arranged in even rows. The first light emitting portions EA11 and the third light emitting portions EA13 may be arranged in the first direction (X-axis direction) in each of the even rows. The first light emitting portions EA11 and the third light emitting portions EA13 may be arranged alternately in each of the even rows.

The second light emitting portions EA12 and the fourth light emitting portions EA14 may be arranged in odd columns. The second light emitting portions EA12 and the fourth light emitting portions EA14 may be arranged in the second direction (Y-axis direction) in each of the odd columns. The second light emitting portions EA12 and the fourth light emitting portions EA14 may be arranged alternately in each of the odd columns.

The first light emitting portions EA11 and the third light emitting portions EA13 may be arranged in even columns.

The first light emitting portions EA11 and the third light emitting portions EA13 may be arranged in the second direction (Y-axis direction) in each of the even columns. The first light emitting portions EAU and the third light emitting portions EA13 may be arranged alternately in each of the even columns.

Figure 6:
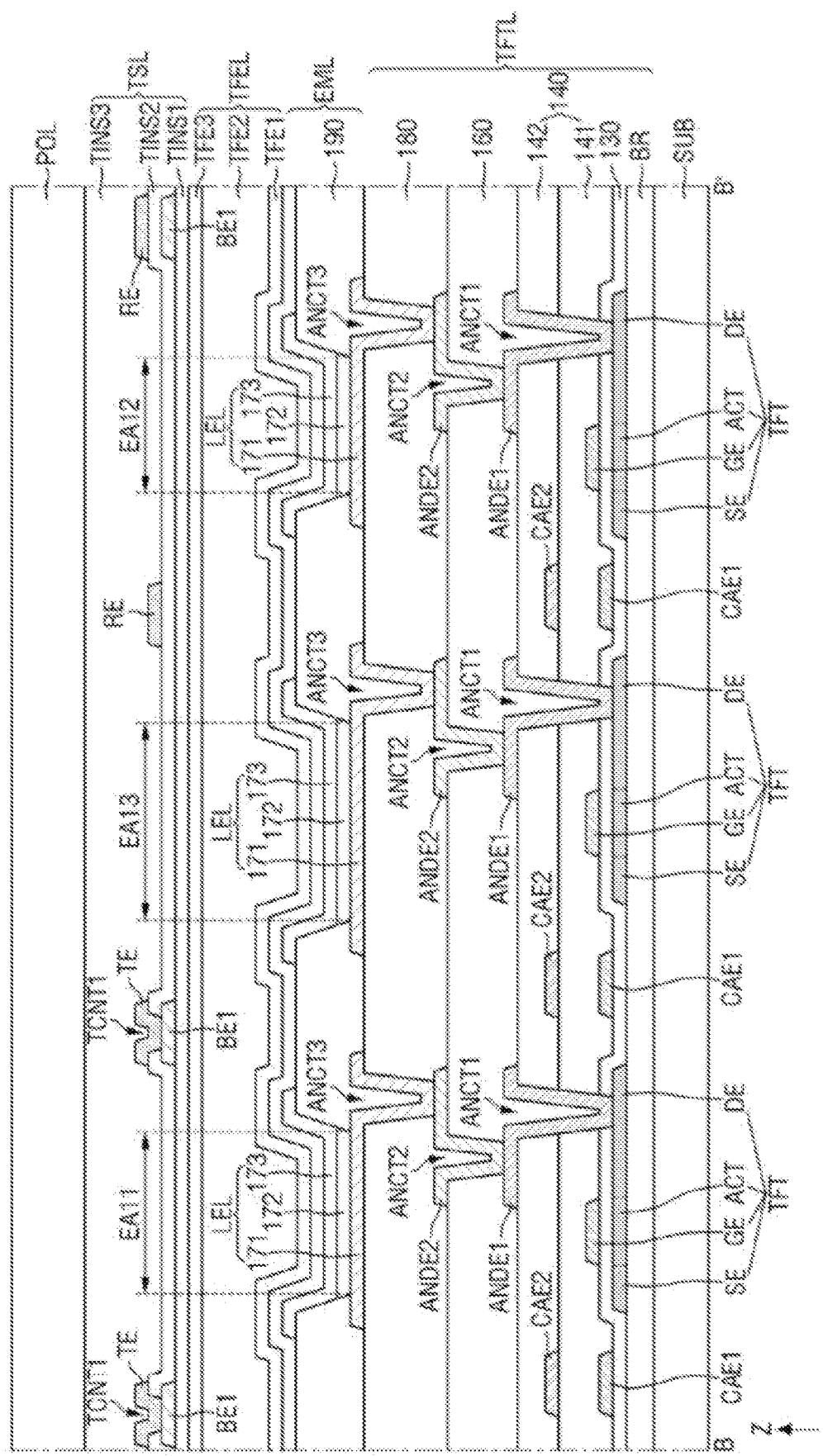
FIG. 6 is a cross-sectional view illustrating an example of the display panel taken along line B-B' of FIG. 5.

FIG. 6 is a cross-sectional view illustrating an example of the display panel taken along line B-B' of FIG. 5.

Referring to FIG. 6, the display panel 300 includes the substrate SUB, a thin film transistor layer TFTL, a light emitting element layer EML, an encapsulation layer TFEL, the touch sensing layer TSL, and a polarizing film POL.

The substrate SUB may be formed of an insulating material such as polymer resin. For example, the substrate SUB may be formed of polyimide. The substrate SUB may be a flexible substrate which can be bent, folded or rolled.

A barrier layer BR may be disposed on the substrate SUB. The barrier layer BR is a layer for protecting transistors of the thin film transistor layer TFTL and a light emitting layer 172 of the light emitting element layer EML from moisture permeating through the substrate SUB which is susceptible to moisture permeation. The barrier layer BR may be formed as a plurality of inorganic layers that are alternately stacked. For example, the barrier layer BR may be formed of multiple layers in which one or more inorganic layers of a silicon nitride layer, a silicon oxynitride layer, a silicon oxide layer, a titanium oxide layer and an aluminum oxide layer are alternately stacked.

A thin film transistor TFT may be disposed on the barrier layer BR. The thin film transistor TFT includes an active layer ACT, a gate electrode GE, a source electrode SE, and a drain electrode DE.

The active layer ACT, the source electrode SE, and the drain electrode DE of the thin film transistor TFT may be disposed on the barrier layer BR. The active layer ACT of the thin film transistor TFT includes polycrystalline silicon, monocrystalline silicon, low-temperature polycrystalline silicon, amorphous silicon, or an oxide semiconductor. The active layer ACT overlapping the gate electrode GE in the third direction (Z-axis direction) that is the thickness direction of the substrate SUB may be defined as a channel region. The source electrode SE and the drain electrode DE that do not overlap the gate electrode GE in the third direction (Z-axis direction) may have conductivity by doping a silicon semiconductor or an oxide semiconductor with ions or impurities.

The gate insulating layer 130 may be disposed on the active layer ACT, the source electrode SE, and the drain electrode DE of the thin film transistor TFT. The gate insulating layer 130 may be formed of an inorganic layer, for example, a silicon nitride layer, a silicon oxynitride layer, a silicon oxide layer, a titanium oxide layer, or an aluminum oxide layer.

The gate electrode GE of the thin film transistor TFT and a first capacitor electrode CAE1 may be disposed on the gate insulating layer 130. The gate electrode GE may overlap the active layer ACT in the third direction (Z-axis direction). The gate electrode GE and the first capacitor electrode CAE1 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first interlayer insulating layer 141 may be disposed on the gate electrode GE and the first capacitor electrode CAE1 of the thin film transistor TFT. The first interlayer insulating layer 141 may be formed of an inorganic layer, for example, a silicon nitride layer, a silicon oxynitride layer, a silicon oxide layer, a titanium oxide layer, or an aluminum oxide layer. The first interlayer insulating layer 141 may be formed of a plurality of inorganic layers.

The second capacitor electrode CAE2 may be disposed on the first interlayer insulating layer 141. The second capacitor electrode CAE2 may overlap the first capacitor electrode CAE1 in the third direction (Z-axis direction). Since the first interlayer insulating layer 141 has a predetermined dielectric constant, a capacitor may be formed by the first capacitor electrode CAE1, the second capacitor electrode CAE2, and the first interlayer insulating layer 141 disposed therebetween. The second capacitor electrode CAE2 may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A second interlayer insulating layer 142 may be disposed on the second capacitor electrode CAE2. The second interlayer insulating layer 142 may be formed of an inorganic layer, for example, a silicon nitride layer, a silicon oxynitride layer, a silicon oxide layer, a titanium oxide layer, or an aluminum oxide layer. The second interlayer insulating layer 142 may be formed of a plurality of inorganic layers.

The first anode connection electrode ANDE1 may be disposed on the second interlayer insulating layer 142. The first anode connection electrode ANDE1 may be connected to the drain electrode DE of the thin film transistor TFT through a first connection contact hole ANCT1 penetrating the gate insulating layer 130, the first interlayer insulating layer 141, and the second interlayer insulating layer 142. The first anode connection electrode ANDE1 may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

A first planarization layer 160 for flattening a stepped portion formed by the thin film transistor TFT may be disposed on the first anode connection electrode ANDE1. The first planarization layer 160 may be formed of an organic layer such as acryl resin, epoxy resin, phenolic resin, polyamide resin, polyimide resin or the like.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

The second planarization layer 180 may be disposed on the second anode connection electrode ANDE2. The second planarization layer 180 may be formed of an organic layer such as acryl resin, epoxy resin, phenolic resin, polyamide resin, polyimide resin and the like.

Light emitting elements LEL and a bank 190 may be disposed on the second planarization layer 180. Each of the light emitting elements LEL includes a pixel electrode 171, a light emitting layer 172, and a common electrode 173.

The pixel electrode 171 may be disposed on the second planarization layer 180. The pixel electrode 171 may be connected to a second anode connection electrode ANDE2 through a third connection contact hole ANCT3 penetrating the second planarization layer 180.

In a top emission structure in which light is emitted toward the common electrode 173 when viewed with respect to the light emitting layer 172, the pixel electrode 171 may be formed of a metal material having high reflectivity to have a stacked structure (Ti/Al/Ti) of aluminum and titanium, a stacked structure (ITO/Al/ITO) of aluminum and indium tin oxide (ITO), an APC alloy, and a stacked structure (ITO/APC/ITO) of an APC alloy and ITO. In an embodiment, the APC alloy is an alloy of silver (Ag), palladium (Pd) and copper (Cu).

The bank 190 may be formed to partition the pixel electrode 171 on the second planarization layer 180 to define the first light emitting portion EAU, the second light emitting portion EA12, the third light emitting portion EA13, and the fourth light emitting portion EA14 of each of the pixels PX. The bank 190 may be disposed to cover the edge of the pixel electrode 171. The bank 190 may be formed of an organic layer such as acryl resin, epoxy resin, phenolic resin, polyamide resin, polyimide resin or the like.

Each of the first light emitting portion EA11, the second light emitting portion EA12, the third light emitting portion EA13, and the fourth light emitting portion EA14 of each of the pixels PX represents an area in which the pixel electrode 171, the light emitting layer 172, and the common electrode 173 are sequentially stacked, and holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material to emit light in a predetermined color. For example, the light emitting layer 172 includes a hole transporting layer, an organic material layer, and an electron transporting layer.

The common electrode 173 may be disposed on the light emitting layer 172. The common electrode 173 may be disposed to cover the light emitting layer 172. The common electrode 173 may be a common layer that is commonly formed at the first light emitting portion EA11, the second light emitting portion EA12, the third light emitting portion EA13, and the fourth light emitting portion EA14 of each of the pixels PX. A capping layer may be formed on the common electrode 173.

In the top emission structure, the common electrode 173 may be formed of a transparent conductive material (TCO) such as ITO or IZO capable of transmitting light or a semi-transmissive conductive material such as magnesium (Mg), silver (Ag), or an alloy of magnesium (Mg) and silver (Ag). When the common electrode 173 is formed of a semi-transmissive conductive material, the light emission efficiency can be increased due to a micro-cavity effect.

The encapsulation layer TFEL may be disposed on the common electrode 173. The encapsulation layer TFEL includes at least one inorganic layer to prevent oxygen or moisture from permeating into the light emitting element layer EML. In addition, the encapsulation layer TFEL includes at least one organic layer to protect the light emitting element layer EML from foreign substances such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. The first inorganic encapsulation layer TFE1 and the second inorganic encapsulation layer TFE3 may be formed of multiple layers in which one or more inorganic layers of a silicon nitride layer, a silicon oxynitride layer, a silicon oxide layer, a titanium oxide layer and an aluminum oxide layer are alternately stacked. The encapsulation organic layer TFE2 may be an organic layer such as acryl resin, epoxy resin, phenolic resin, polyamide resin, polyimide resin or the like.

The touch sensing layer TSL may be disposed on the encapsulation layer TFEL. The touch sensing layer TSL includes a first touch insulating layer TINS1, the first connection electrode BE1, a second touch insulating layer TINS2, the driving electrode TE, the sensing electrode RE, and a third touch insulating layer TINS3.

The first touch insulating layer TINS1 may be formed of an inorganic layer, for example, a silicon nitride layer, a silicon oxynitride layer, a silicon oxide layer, a titanium oxide layer, or an aluminum oxide layer.

The first connection electrode BE1 may be disposed on the first touch insulating layer TINS1. The first connection electrode BE1 may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

The second touch insulating layer TINS2 may be disposed on the first connection electrode BE1. The second touch insulating layer TINS2 may be formed of an inorganic layer, for example, a silicon nitride layer, a silicon oxynitride layer, a silicon oxide layer, a titanium oxide layer, or an aluminum oxide layer. Alternatively, the second touch insulating layer TINS2 may be formed of an organic layer such as acryl resin, epoxy resin, phenolic resin, polyamide resin, polyimide resin and the like.

The driving electrodes TE and the sensing electrodes RE may be disposed on the second touch insulating layer TINS2. Further, the dummy patterns DE, the first touch driving lines TL1, the second touch driving lines TL2, and the touch sensing lines RL shown in FIG. 4 as well as the driving electrodes TE and the sensing electrodes RE may be arranged on the second touch insulating layer TINS2. The driving electrodes TE and the sensing electrodes RE may be formed as a single layer or multiple layers made of any one of molybdenum (Mo), aluminum (Al), chromium (Cr), gold (Au), titanium (Ti), nickel (Ni), neodymium (Nd) and copper (Cu), or an alloy thereof.

The driving electrode TE and the sensing electrode RE may overlap the first connection electrode BE1 in the third direction (Z-axis direction). The driving electrode TE may be connected to the first connection electrode BE1 through the first touch contact hole TCNT1 penetrating the first touch insulating layer TINS1.

The third touch insulating layer TINS3 may be formed on the driving electrodes TE and the sensing electrodes RE. The third touch insulating layer TINS3 may serve to flatten the stepped portion formed by the driving electrodes TE, the sensing electrodes RE, and the first connection electrodes BE1. The third touch insulating layer TINS3 may be formed of an organic layer such as acryl resin, epoxy resin, phenolic resin, polyamide resin, polyimide resin or the like.

The polarizing film POL may be disposed on the touch sensing layer TSL to prevent low visibility due to reflection of external light. The polarizing film POL may include a phase retardation film such as a linear polarizer plate and a quarter-wave ($\lambda/4$) plate.

Figure 7:
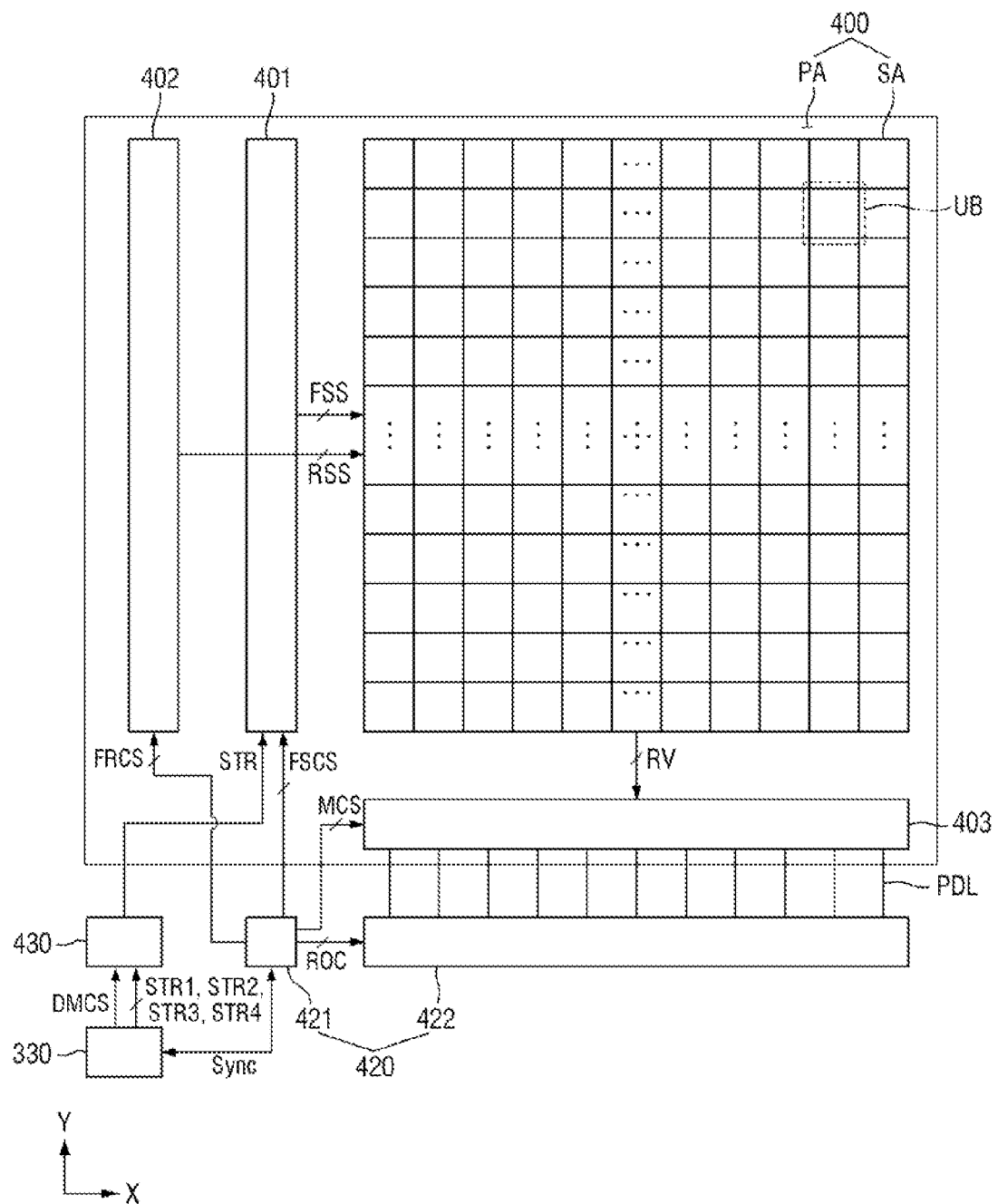
FIG. 7 is a block diagram showing a fingerprint sensor device according to an embodiment of the disclosure.
Figure 8:
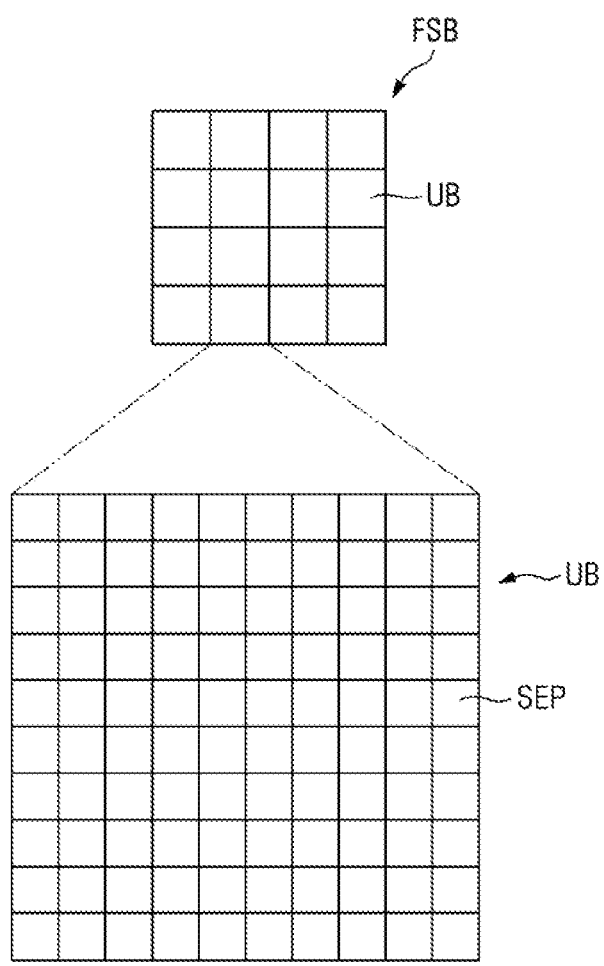
FIG. 8 illustrates an example of each of a fingerprint sensor block and a unit block of FIG. 7.
Figure 9:
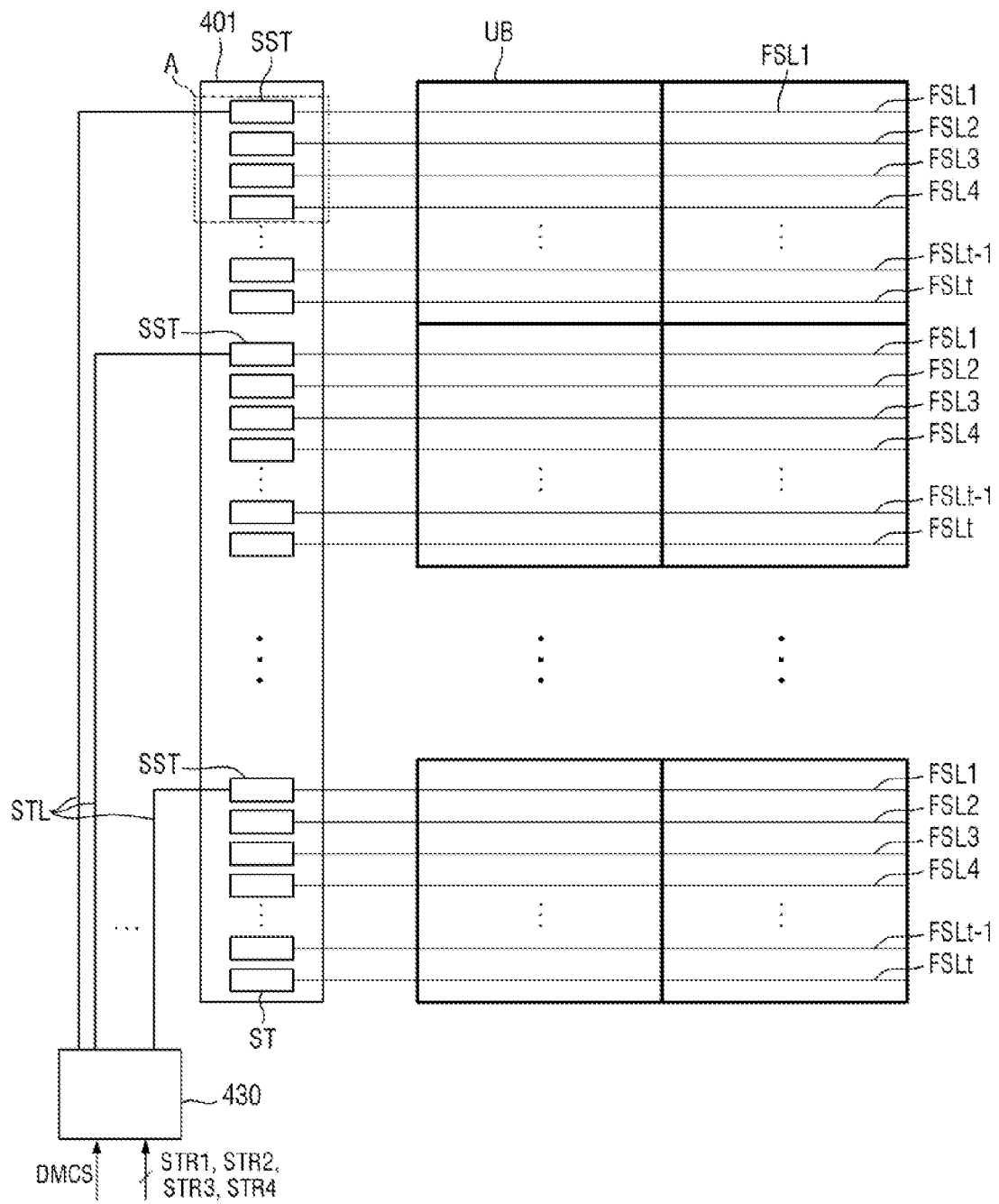
FIG. 9 is a block diagram illustrating a start stage of the fingerprint scan driver of FIG. 7.

FIG. 7 is a block diagram showing a fingerprint sensor device according to an embodiment of the disclosure. FIG. 8 illustrates an example of each of a fingerprint sensor block and a unit block of FIG. 7. FIG. 9 is a block diagram illustrating a start stage of the fingerprint scan driver of FIG. 7.

Referring to FIG. 7, the fingerprint sensor device 400 includes a fingerprint scan driver 401 (e.g., a scan driver circuit), a fingerprint reset driver 402 (e.g., a reset driver circuit), and a multiplexer 403 arranged in the peripheral area PA, and the fingerprint driving circuit 420 may include a fingerprint controller 421 (e.g., a control circuit) and a readout circuit 422.

The sensor area SA may include a plurality of unit blocks UB. For example, distinct parts of the sensor area DA may be referred to as unit blocks UB. The plurality of unit blocks UB may have the same size, but embodiments of the present disclosure are not limited thereto. The sensor area SA may include M (M being an integer of 2 or more) unit blocks UB arranged in the first direction (X-axis direction) and N (N being an integer of 2 or more) unit blocks UB arranged in the second direction (Y-axis direction). That is, the sensor area SA may include M×N unit blocks UB.

The fingerprint sensor block FSB may be set to some unit blocks UB among the M×N unit blocks UB. The fingerprint sensor block FSB may be the unit blocks UB corresponding to the area in contact with the finger F when a user touches the cover window 100 of the display device 10 with the finger F for fingerprint authentication. For example, a group of the unit blocks UB touched by the finger F may be referred to as the fingerprint sensor block FSB. For example, the fingerprint sensor block FSB may include 16 unit blocks UB as shown in FIG. 8. In this embodiment, the fingerprint sensor block FSB includes four unit blocks UB arranged in the first direction (X-axis direction) and four unit blocks UB arranged in the second direction (Y-axis direction). That is, the fingerprint sensor block FSB may include 4×4 unit blocks UB.

Each of the plurality of unit blocks UB may include a plurality of sensor pixels SEP as shown in FIG. 8. For example, each of the plurality of unit blocks UB may include 100 sensor pixels SEP as shown in FIG. 8. In this embodiment, each of the plurality of unit blocks UB includes 10 sensor pixels SEP arranged in the first direction (X-axis direction) and 10 sensor pixels SEP arranged in the second direction (Y-axis direction). That is, each of the plurality of unit blocks UB includes 10×10 sensor pixels SEP. The sensor pixel SEP will be described in detail later in conjunction with FIG. 9.

In each of the plurality of unit blocks UB, t fingerprint scan lines FSL1 to FSLt may be arranged. For example, when each of the plurality of unit blocks UB includes 10×10 sensor pixels SEP as shown in FIG. 8, 10 fingerprint scan lines may be arranged in each of the plurality of unit blocks UB.

The fingerprint scan driver 401 may sequentially apply fingerprint scan signals FSS to the fingerprint scan lines FSL arranged in the sensor area SA in response to start signals STR1, STR2, STR3, and STR4 applied from the touch driving circuit 330 and a fingerprint scan control signal FSCS applied from the fingerprint controller 421 through a demultiplexer 430. The fingerprint scan driver 401 may be disposed outside on one side of the sensor area SA.

The fingerprint reset driver 402 may simultaneously apply fingerprint reset signals RSS to fingerprint reset lines RSL arranged in the sensor area SA in response to a fingerprint reset control signal FRCS applied from the fingerprint controller 421. The fingerprint reset driver 402 may be disposed outside on one side of the sensor area SA. In an embodiment where the fingerprint reset driver 402 is disposed outside, the fingerprint reset driver 402 is more distant from the sensor area SA than the fingerprint scan driver 401. Alternatively, the fingerprint reset driver 402 may be disposed outside on the other side of the sensor area SA.

The multiplexer 403 may connect fingerprint sensing lines FRL connected to the sensor pixels SEP to the pad lines PDL electrically connected to the fingerprint driving circuit 420 in response to multiplexer control signals MCS in P (P being an integer of 2 or more):1 correspondence. For example, the multiplexer 403 may sequentially connect P fingerprint sensing lines FRL to one pad line PDL in response to the multiplexer control signals MCS.

The fingerprint controller 421 controls the driving timing of the fingerprint scan driver 401, the fingerprint reset driver 402, the multiplexer 403, and the readout circuit 422. To this end, the fingerprint controller 421 may output a fingerprint scan control signal FSCS to the fingerprint scan driver 401, and may output a fingerprint reset control signal FRCS to the fingerprint reset driver 402. Further, the fingerprint controller 421 may output the multiplexer control signals MCS to the multiplexer 403, and may output a readout control signal ROC to the readout circuit 422.

The readout circuit 422 may select the pad lines PDL corresponding to the fingerprint sensor block FSB in response to the readout control signal ROC of the fingerprint controller 421. The readout circuit 422 may sense the fingerprint sensing voltages of the selected pad lines PDL. The readout circuit 422 may convert the fingerprint sensing voltages sensed by the pad lines PDL into fingerprint sensing data FDS and output the fingerprint sensing data FDS. The readout circuit 422 may output the fingerprint sensing data FDS to the main processor 710.

The demultiplexer 430 may receive a demultiplexer control signal DMCS and start signals STR1, STR2, STR3, and STR4 from the touch driving circuit 330. The demultiplexer 430 may apply the start signals STR1, STR2, STR3, and STR4 to at least one of a plurality of start lines STL in response to the demultiplexer control signal DMCS as shown in FIG. 9. In an embodiment, each of the start lines STL is connected to a given start stage of the fingerprint scan driver 401. In an embodiment, outputs of the demultiplexer 430 are directly connected to start terminals of the start stages.

The fingerprint scan driver 401 may include a plurality of stages ST. Among the plurality of stages ST, the stage connected to a first fingerprint scan line FSL (e.g., FSL1) of each of the plurality of unit blocks UB may be defined as a start stage SST as shown in FIG. 9. The first fingerprint scan line FSL indicates the fingerprint scan line FSL to which a first fingerprint scan signal is applied in each of the plurality of unit blocks UB. In this specification, for simplicity of description, the first fingerprint scan line FSL is described as the fingerprint scan line disposed at the uppermost portion in each of the plurality of unit blocks UB. The start stage SST may be connected to the start line STL connected to the demultiplexer 430.

In an embodiment, the stage ST connected to the $t^{th}$ fingerprint scan line FSLt of each of the plurality of unit blocks UB is not connected to the start stage SST adjacent thereto. For example, the stage ST connected to the $t^{th}$ fingerprint scan line FSLt of the unit block UB in a first row is not connected to the start stage SST of the unit block UB in a second row. Therefore, when the fingerprint sensor block FSB includes 4×4 unit blocks UB as shown in FIG. 8, the fingerprint scan driver 401 may sequentially apply the fingerprint scan signals to the fingerprint scan lines FSL of each of the unit blocks UB in four rows of the fingerprint sensor block FSB.

The demultiplexer 430 may be connected to the plurality of start lines STL as shown in FIG. 9. The demultiplexer 430 may select the start lines STL to which the start signals STR1, STR2, STR3, and STR4 are applied among the plurality of start lines STL in response to the demultiplexer control signal DMCS. The demultiplexer 430 may output a first start signal STR1 of the touch driving circuit 330 to a first start line among the start lines STL selected in response to the demultiplexer control signal DMCS, and may output a second start signal STR2 of the touch driving circuit 330 to a second start line. Further, the demultiplexer 430 may output the third start signal STR3 of the touch driving circuit 330 to a third start line among the start lines STL selected in response to the demultiplexer control signal DMCS, and may output the fourth start signal STR4 of the touch driving circuit 330 to a fourth start line. FIG. 9 illustrates the four start signals STR1, STR2, STR3, and STR4 for simplicity of description, but embodiments of the disclosure are not limited thereto. The number of start signals may vary depending on the number of rows of the unit blocks UB included in the fingerprint sensor block FSB.

As described above, by using the demultiplexer 430, it is possible to select the unit blocks UB that output the fingerprint scan signal among the plurality of unit blocks UB. Therefore, by using the demultiplexer 430, it is possible to output the fingerprint scan signal to the fingerprint scan lines FSL of each of the unit blocks UB in the four rows of the fingerprint sensor block FSB selected for fingerprint authentication.

The touch driving circuit 330 may output the start signals STR1, STR2, STR3, and STR4 to the demultiplexer 430. In an embodiment, in the touch driving circuit 330, the pulse magnitude of the touch driving signal applied to the driving electrodes TE and the pulse magnitudes of the start signals STR1, STR2, STR3, and STR4 are substantially the same. Further, the touch driving circuit 330 may output the demultiplexer control signal DMCS to the demultiplexer 430. The touch driving circuit 330 may generate the demultiplexer control signal DMCS so that the start lines STL to which the start signals STR1, STR2, STR3, and STR4 are applied are selected among the plurality of start lines STL based on touch coordinates where touch of a user's finger for fingerprint authentication occurs. Furthermore, the touch driving circuit 330 may transmit and receive a synchronization signal SYNC for timing synchronization with the fingerprint controller 421.

As shown in FIG. 9, the touch driving circuit 330 directly applies the start signals STR1, STR2, STR3, and STR4 to the fingerprint scan driver 401 through the demultiplexer 430, so that it is not necessary for the fingerprint driving circuit 420 to apply the start signals STR1, STR2, STR3, and STR4 to the plurality of start lines STL. In this embodiment, it is not necessary to electrically connect the fingerprint driving circuit 420 to the plurality of start lines STL.

In summary, when the touch driving circuit 330 directly applies the start signals STR1, STR2, STR3, and STR4 to the fingerprint scan driver 401 through the demultiplexer 430, the number of bumps of the fingerprint driving circuit 420 can be reduced compared to when the fingerprint driving circuit 420 is electrically connected to the plurality of start lines STL, so that the area of the fingerprint driving circuit 420 can be reduced. Therefore, it is possible to reduce the manufacturing cost due to the fingerprint driving circuit 420.

Figure 10:
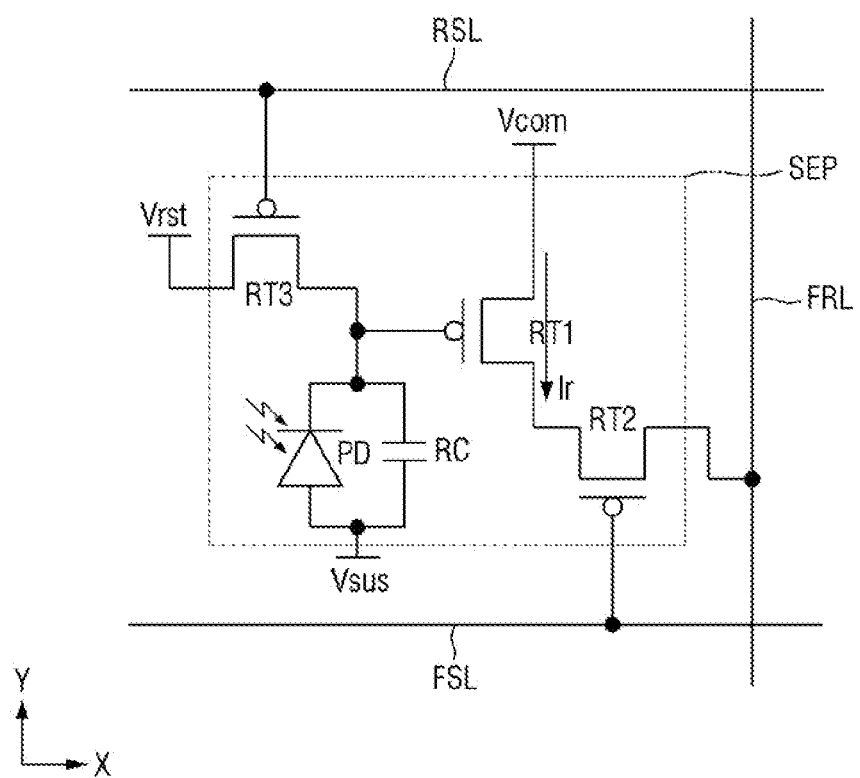
FIG. 10 is a circuit diagram illustrating an example of a sensor pixel of FIG. 8.

FIG. 10 is a circuit diagram illustrating an example of a sensor pixel of FIG. 8.

Referring to FIG. 10, the fingerprint scan line FSL and the fingerprint reset line RSL may extend in the first direction (X-axis direction), and the fingerprint sensing line FRL may extend in the second direction (Y-axis direction). The sensor pixel SEP may be disposed in the region partitioned by the fingerprint scan line FSL, the fingerprint reset line RSL, and the fingerprint sensing line FRL.

In an embodiment, the sensor pixel SEP includes a photodetector PD (e.g., a photo-diode), a first sensing transistor RT1, a second sensing transistor RT2, a third sensing transistor RT3, and a sensing capacitor RC.

The photodetector PD may include a first electrode, a PIN semiconductor layer, and a second electrode. The first electrode of the photodetector PD may be an anode electrode and the second electrode of the photodetector PD may be a cathode electrode. The first electrode of the photodetector PD may be connected to a first power voltage source Vsus to which a first power voltage is applied. The second electrode of the photodetector PD may be connected to the gate electrode of the first sensing transistor RT1 and the first electrode of the sensing capacitor RC. The PIN semiconductor layer of the photodetector PD may include a P-type semiconductor layer connected to the anode electrode, an N-type semiconductor layer connected to the cathode electrode, and an I-type semiconductor layer disposed between the P-type semiconductor layer and the N-type semiconductor layer.

The first sensing transistor RT1 may allow a sensing current Ir to flow depending on the voltage of the first electrode of the sensing capacitor RC. The amount of the sensing current Ir may vary depending on the voltage of the first electrode of the sensing capacitor RC. The gate electrode of the first sensing transistor RT1 may be connected to the second electrode of the photodetector PD and the first electrode of the sensing capacitor RC. The first electrode of the first sensing transistor RT1 may be connected to a common voltage source Vcom to which a common voltage is applied. The second electrode of the first sensing transistor RT1 may be connected to the first electrode of the second sensing transistor RT2.

The second sensing transistor RT2 may allow the sensing current Ir of the first sensing transistor RT1 to flow toward the fingerprint sensing line FRL when the fingerprint scan signal of a gate-on voltage is applied to the fingerprint scan line FSL. In this embodiment, the fingerprint sensing line FRL may be charged with the sensing voltage by the sensing current Ir. The gate electrode of the second sensing transistor RT2 may be connected to the fingerprint scan line FSL, the first electrode thereof may be connected to the second electrode of the first sensing transistor RT1, and the second electrode thereof may be connected to the fingerprint sensing line FRL.

When the fingerprint reset signal of the gate-on voltage is applied to the fingerprint reset line RSL, the third sensing transistor RT3 may reset the voltage of the first electrode of the sensing capacitor RC to a reset voltage of a reset voltage source Vrst. The gate electrode of the third sensing transistor RT3 may be connected to the fingerprint reset line RSL, the first electrode thereof may be connected to the reset voltage source Vrst, and the second electrode thereof may be connected to the first electrode of the sensing capacitor RC.

The first electrode of the sensing capacitor RC may be connected to the gate electrode of the first sensing transistor RT1 and the second electrode of the photodetector PD. The second electrode of the sensing capacitor RC may be connected to the first power voltage source Vsus. Therefore, the voltage difference between the first electrode and the second electrode of the sensing capacitor RC may be maintained by the sensing capacitor RC.

FIG. 10 mainly describes an embodiment where the first sensing transistor RT1, the second sensing transistor RT2, and the third sensing transistor RT3 are formed as a P-type metal oxide semiconductor field effect transistor (MOSFET). However, embodiments of the disclosure are not limited thereto, and they may be formed as an N-type MOSFET. Further, any one of the first electrode and the second electrode of each of the first sensing transistor RT1, the second sensing transistor RT2, and the third sensing transistor RT3 may the source electrode and the other one may be the drain electrode.

Figure 11:
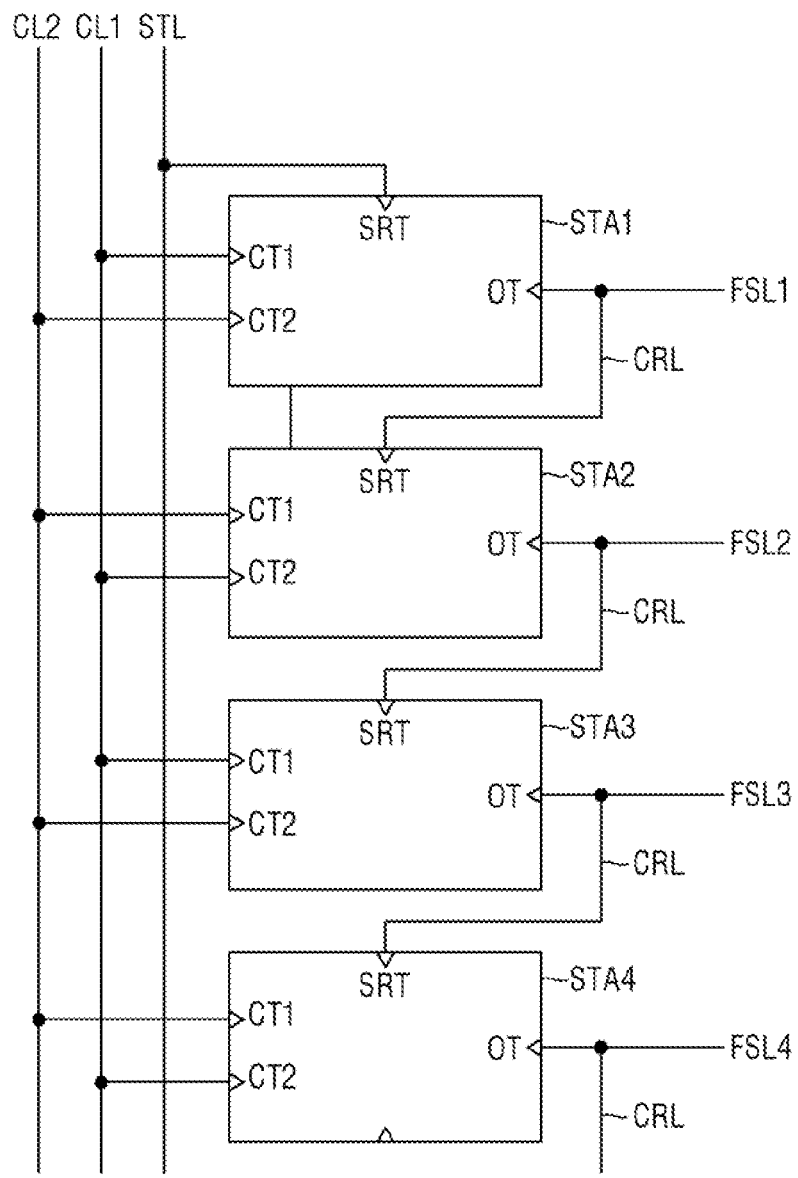
FIG. 11 illustrates an example of the fingerprint scan driver of FIG. 9.

FIG. 11 illustrates an example of the fingerprint scan driver of FIG. 9. FIG. 11 shows an example of area A of the fingerprint scan driver of FIG. 9. For simplicity of description, FIG. 11 illustrates a first stage STA1 connected to the first fingerprint scan line FSL1, a second stage STA2 connected to the second fingerprint scan line FSL2, a third stage STA3 connected to the third fingerprint scan line FSL3, and a fourth stage STA4 connected to the fourth fingerprint scan line FSL4 in each unit block UB. In FIG. 11, the first stage STA1 may be the start stage SST.

Referring to FIG. 11, the fingerprint scan driver 401 may include a plurality of stages STA1 to STA4. Each of the plurality of stages STA1 to STA4 may be connected to the start line STL or a carry signal line CRL, a first clock line CL1, and a second clock line CL2. For example, the first stage STA1 may be connected to the start line STL and a carry line CRL, and the second-fourth stages STA2-STA4 may be connected only to a carry line CRL. The start line STL may be the line to which the start signal STR1/STR2/STR3/STR4 is applied, and the carry signal line CRL may be the line to which a carry signal is applied. The first clock line CL1 may be the line to which the first clock signal CLK1 is applied, and the second clock line CL2 may be the line to which the second clock signal CLK2 is applied. In an embodiment, the first clock line CL1 receives a first clock signal and the second clock line CL2 receives a second clock signal different from the first clock signal.

Each of the plurality of stages STA1 to STA4 includes a start terminal SRT, a first clock terminal CT1, a second clock terminal CT2, and an output terminal OT.

The start terminal SRT of each of the plurality of stages STA1 to STA4 may be connected to the start line STL or a carry signal line CRL.

The first clock terminal CT1 of each of the plurality of stages STA1 to STA4 may be connected to any one of the first clock line CL1 and the second clock line CL2, and the second clock terminal CT2 of each of the plurality of stages STA1 to STA4 may be connected to the other one of the first clock line CL1 and the second clock line CL2.

The first clock terminals CT1 of the plurality of stages STA1 to STA4 may be alternately connected to the first clock line CL1 and the second clock line CL2. For example, the first clock terminal CT1 of the first stage STA1 may be connected to the first clock line CL1, the first clock terminal CT1 of the second stage STA2 may be connected to the second clock line CL2, the first clock terminal CT1 of the third stage STA3 may be connected to the first clock line CL1, and the first clock terminal CT1 of the fourth stage STA4 may be connected to the second clock line CL2.

The second clock terminals CT2 of the plurality of stages STA1 to STA4 may be alternately connected to the first clock line CL1 and the second clock line CL2. For example, the second clock terminal CT2 of the first stage STA1 may be connected to the second clock line CL2, the second clock terminal CT2 of the second stage STA2 may be connected to the first clock line CL1, the second clock terminal CT2 of the third stage STA3 may be connected to the second clock line CL2, and the second clock terminal CT2 of the fourth stage STA4 may be connected to the first clock line CL1.

The output terminal OT of each of the plurality of stages STA1 to STA4 may be connected to any one of the plurality of fingerprint scan lines FSL1 to FSL4 to output the fingerprint scan signal. Further, the output terminal OT of each of the plurality of stages ST1A to STA4 may be connected to the carry signal line CRL. For example, the carry signal line CRL connected to the output terminal OT of the first stage STA1 may be connected to the start terminal SRT of the second stage STA2. The carry signal line CRL connected to the output terminal OT of the second stage STA2 may be connected to the start terminal SRT of the third stage STA3. The carry signal line CRL connected to the output terminal OT of the third stage STA3 may be connected to the start terminal SRT of the fourth stage STA4.

The stages STA1-STA4 may be daisy-chained together. For example, a first carry signal line connected to a first fingerprint scan line FSL1 and a first output terminal of the first stage STA1 is connected to a start terminal of the second stage STA2, a second carry signal line connected to a second fingerprint scan line FSL2 and a second output terminal of the second stage STA2 is connected to a start terminal of the third stage STA3, etc.

Figure 12:
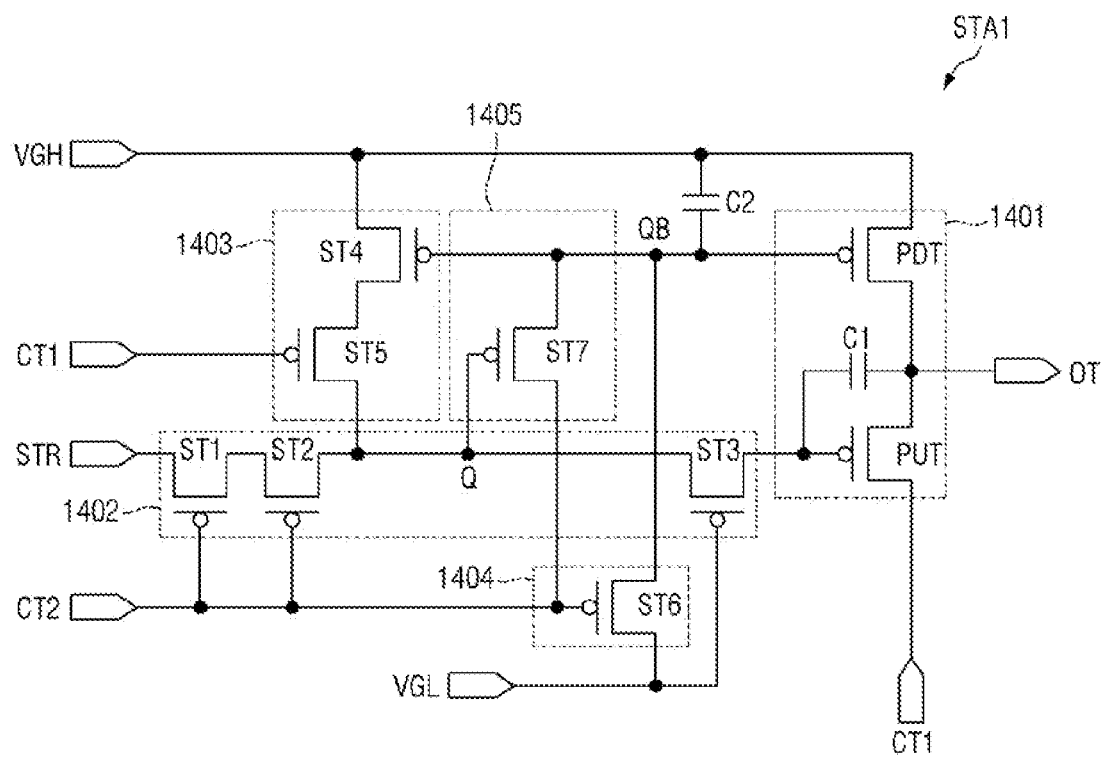
FIG. 12 is a circuit diagram showing an example of a first stage of FIG. 11.

FIG. 12 is a circuit diagram showing an example of the first stage of FIG. 11.

Referring to FIG. 12, the first stage ST1 includes an output unit 1401 (e.g., an output circuit), a first pull-up node control unit 1402 (e.g., a control circuit), a second pull-up node control unit 1403 (e.g., a control circuit), a first pull-down node control unit 1404 (e.g., a control circuit), and a second pull-down node control unit 1405 (e.g., a control circuit).

When a pull-up node Q has a gate-on voltage, the output unit 1401 outputs the fingerprint scan signal of the gate-on voltage to the output terminal OT. When a pull-down node QB has the gate-on voltage, the output unit 1401 outputs the fingerprint scan signal of a gate-off voltage to the output terminal OT. The output unit 1401 includes a pull-up transistor PUT, a pull-down transistor PDT, and a first capacitor C1.

When the pull-up node Q has the gate-on voltage, the pull-up transistor PUT outputs a clock signal inputted to the first clock terminal CT1 to the output terminal OT. The gate electrode of the pull-up transistor PUT may be connected to the pull-up node Q, the first electrode thereof may be connected to the output terminal OT, and the second electrode thereof may be connected to the first clock terminal CT1.

When the pull-down node QB has the gate-on voltage, the pull-down transistor PDT outputs the gate-off voltage applied to a gate-off voltage terminal VGH to the output terminal OT. In an embodiment, the gate-off voltage is higher than the gate-on voltage. The gate electrode of the pull-down transistor PDT may be connected to the pull-down node QB, the first electrode thereof may be connected to the gate-off voltage terminal VGH, and the second electrode thereof may be connected to the output terminal OT.

The first capacitor C1 may be disposed between the pull-up node Q and the output terminal OT. The first electrode of the first capacitor C1 may be connected to the pull-up node Q, and the second electrode thereof may be connected to the output terminal OT. The voltage difference between the pull-up node Q and the output terminal OT may be maintained by the first capacitor C1.

The first pull-up node control unit 1402 may apply the gate-on voltage or the gate-off voltage to the pull-up node Q in response to a start signal STR (e.g., STR1) or the carry signal applied to the start terminal SRT. The first pull-up node control unit 1402 may include a first transistor ST1, a second transistor ST2, and a third transistor ST3.

When the clock signal inputted to the second clock terminal CT2 has the gate-on voltage, the first transistor ST1 and the second transistor ST2 apply the start signal STR or the carry signal inputted to the start terminal SRT to the pull-up node Q. The gate electrode of the first transistor ST1 may be connected to the second clock terminal CT2, the first electrode thereof may be connected to the second electrode of the second transistor STA2, and the second electrode thereof may be connected to the start terminal SRT. The gate electrode of the second transistor ST2 may be connected to the second clock terminal CT2, the first electrode thereof may be connected to the pull-up node Q, and the second electrode thereof may be connected to the first electrode of the first transistor ST1.

The third transistor ST3 may be disposed between the first electrode of the second transistor ST2 and the gate electrode of the pull-up transistor PUT. The gate electrode of the third transistor ST3 may be connected to a gate-on voltage terminal VGL to which the gate-on voltage is applied, the first electrode thereof may be connected to the gate electrode of the pull-up transistor PUT, and the second electrode thereof may be connected to the first electrode of the second transistor ST2.

When the pull-down node QB has the gate-on voltage, the second pull-up node control 1403 may apply the gate-off voltage to the pull-up node Q. The second pull-up node control unit 1403 may include a fourth transistor ST4 and a fifth transistor ST5.

When the pull-down node QB has the gate-on voltage, the fourth transistor ST4 applies the gate-off voltage of the gate-off voltage terminal VGH to the first electrode of the fifth transistor ST5. The gate electrode of the fourth transistor ST4 may be connected to the pull-down node QB, the first electrode thereof may be connected to the gate-off voltage terminal VGH, and the second electrode thereof may be connected to the first electrode of the fifth transistor ST5.

The fifth transistor ST5 connects the second electrode of the fourth transistor ST4 to the pull-up node Q in response to the clock signal inputted to the first clock terminal CT1. The gate electrode of the fifth transistor ST5 may be connected to the first clock terminal CT1, the first electrode thereof may be connected to the second electrode of the fourth transistor ST4, and the second electrode thereof may be connected to the pull-up node Q.

The first pull-down node control unit 1404 may apply the gate-on voltage of the gate-on voltage terminal VGL to the pull-down node QB in response to the clock signal inputted to the second clock terminal CT2. The first pull-down node control unit 1404 may include a sixth transistor ST6. The gate electrode of the sixth transistor ST6 may be connected to the second clock terminal CT2, the first electrode thereof may be connected to the pull-down node QB, and the second electrode thereof may be connected to the gate-on voltage terminal VGL.

The second pull-down node control unit 1405 may connect the pull-down node QB to the second clock terminal CT2 depending on the voltage of the pull-up node Q. The second pull-down node control unit 1405 may include a seventh transistor ST7. The gate electrode of the seventh transistor ST7 may be connected to the pull-up node Q, the first electrode thereof may be connected to the second clock terminal CT2, and the second electrode thereof may be connected to the pull-down node QB.

The second capacitor C2 may be disposed between the pull-down node QB and the gate-off voltage terminal VGH. The first electrode of the second capacitor C2 may be connected to the pull-down node QB, and the second electrode thereof may be connected to the gate-off voltage terminal VGH. The voltage difference between the pull-down node QB and the gate-off voltage terminal VGH may be maintained by the second capacitor C2.

Although FIG. 12 mainly describes an embodiment where the pull-up transistor PUT, the pull-down transistor PDT, the first transistor ST1, the second transistor ST2, the third transistor ST3, the fourth transistor ST4, the fifth transistor ST5, the sixth transistor ST6, and the seventh transistor ST7 are formed as a P-type metal oxide semiconductor field effect transistor (MOSFET), embodiments of the disclosure are not limited thereto and they may be formed as the N-type MOSFET. Further, any one of the first electrode and the second electrode of each of the pull-up transistor PUT, the pull-down transistor PDT, the first transistor ST1, the second transistor ST2, the third transistor ST3, the fourth transistor ST4, the fifth transistor ST5, the sixth transistor ST6, and the seventh transistor ST7 may be the source electrode, and the other one may be the drain electrode.

Figure 13:
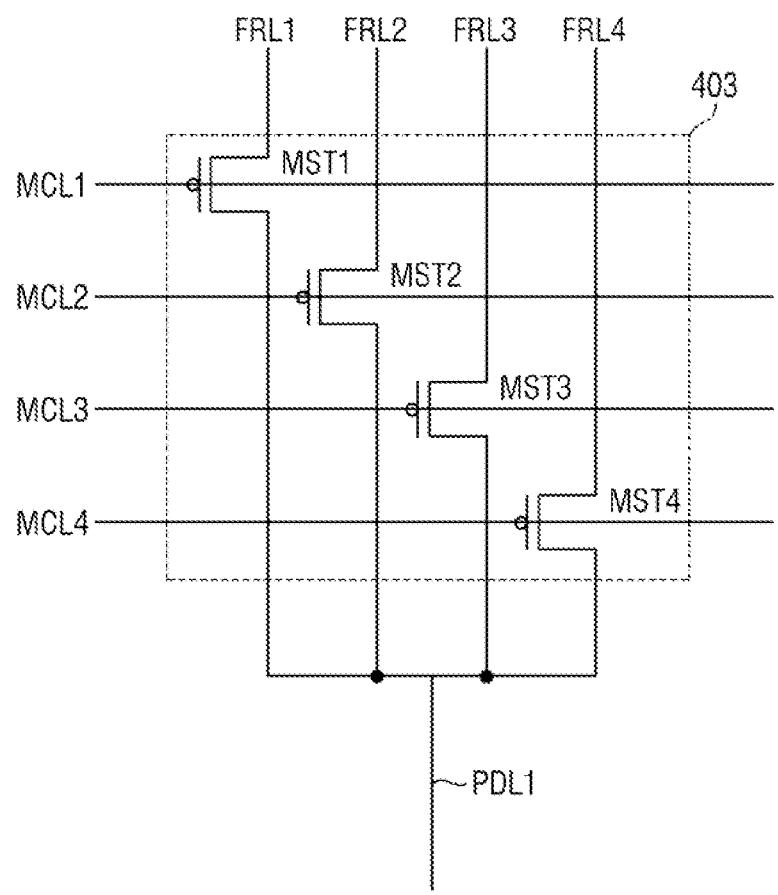
FIG. 13 is a circuit diagram showing an example of a multiplexer of FIG. 7.

FIG. 13 is a circuit diagram showing an example of the multiplexer of FIG. 7. FIG. 13 illustrates the case where the multiplexer 403 selectively connects a first sensing line FRL1, a second sensing line FRL2, a third sensing line FRL3, and a fourth sensing line FRL4 to a first pad line PDL1.

Referring to FIG. 13, the multiplexer 403 may perform time division multiplexing on the sensing voltages of the sensing lines FRL1, FRL2, FRL3, and FRL4 using multiplexer transistors MST1, MST2, MST3, and MST4 controlled by the multiplexer control signals MCS applied to multiplexer control lines MCL1, MCL2, MCL3, and MCL4, and apply them to the first pad line PDL1. Although FIG. 13 illustrates an embodiment where the multiplexer 403 performs time division multiplexing on the sensing voltages of the four sensing lines FRL1, FRL2, FRL3, and FRL4 and applies them to one pad line PDL1, embodiments of the disclosure are not limited thereto.

The multiplexer 403 may include a first multiplexer transistor MST1, a second multiplexer transistor MST2, a third multiplexer transistor MST3, and a fourth multiplexer transistor MST4.

The first multiplexer transistor MST1 may control the connection between the first sensing line FRL1 and the first pad line PDL1 in response to a first multiplexer control signal of the first multiplexer control line MCL1. When the first multiplexer control signal of the gate-on voltage is applied to the first multiplexer control line MCL1, the first multiplexer transistor MST1 may connect the first sensing line FRL1 to the first pad line PDL1. The gate electrode of the first multiplexer transistor MST1 may be connected to the first multiplexer control line MCL1, the first electrode thereof may be connected to the first sensing line MCL1, and the second electrode thereof may be connected to the first pad line PDL.

The second multiplexer transistor MST2 may control the connection between the second sensing line FRL2 and the first pad line PDL1 in response to a second multiplexer control signal of the second multiplexer control line MCL2. When the second multiplexer control signal of the gate-on voltage is applied to the second multiplexer control line MCL2, the second multiplexer transistor MST2 may connect the second sensing line FRL2 to the first pad line PDL1. The gate electrode of the second multiplexer transistor MST2 may be connected to the second multiplexer control line MCL2, the first electrode thereof may be connected to the second sensing line MCL2, and the second electrode thereof may be connected to the first pad line PDL1.

The third multiplexer transistor MST3 may control the connection between the third sensing line FRL3 and the first pad line PDL1 in response to a third multiplexer control signal of the third multiplexer control line MCL3. When the third multiplexer control signal of the gate-on voltage is applied to the third multiplexer control line MCL3, the third multiplexer transistor MST3 may connect the third sensing line FRL3 to the first pad line PDL1. The gate electrode of the third multiplexer transistor MST3 may be connected to the third multiplexer control line MCL3, the first electrode thereof may be connected to the third sensing line MCL3, and the second electrode thereof may be connected to the first pad line PDL.

The fourth multiplexer transistor MST4 may control the connection between the fourth sensing line FRL4 and the first pad line PDL1 in response to a fourth multiplexer control signal of the fourth multiplexer control line MCL4. When the fourth multiplexer control signal of the gate-on voltage is applied to the fourth multiplexer control line MCL4, the fourth multiplexer transistor MST4 may connect the fourth sensing line FRL4 to the first pad line PDL1. The gate electrode of the fourth multiplexer transistor MST4 may be connected to the fourth multiplexer control line MCL4, the first electrode thereof may be connected to the fourth sensing line MCL4, and the second electrode thereof may be connected to the first pad line PDL1.

Although FIG. 13 mainly describes an embodiment where the first multiplexer transistor MST1, the second multiplexer transistor MST2, the third multiplexer transistor MST3, and the fourth multiplexer transistor MST4 are formed as the P-type metal oxide semiconductor field effect transistor (MOSFET), embodiments of the disclosure are not limited thereto, and they may be formed as the N-type MOSFET. Further, any one of the first electrode and the second electrode of each of the first multiplexer transistor MST1, the second multiplexer transistor MST2, the third multiplexer transistor MST3, and the fourth multiplexer transistor MST4 may be the source electrode, and the other one may be the drain electrode.

Figure 14:
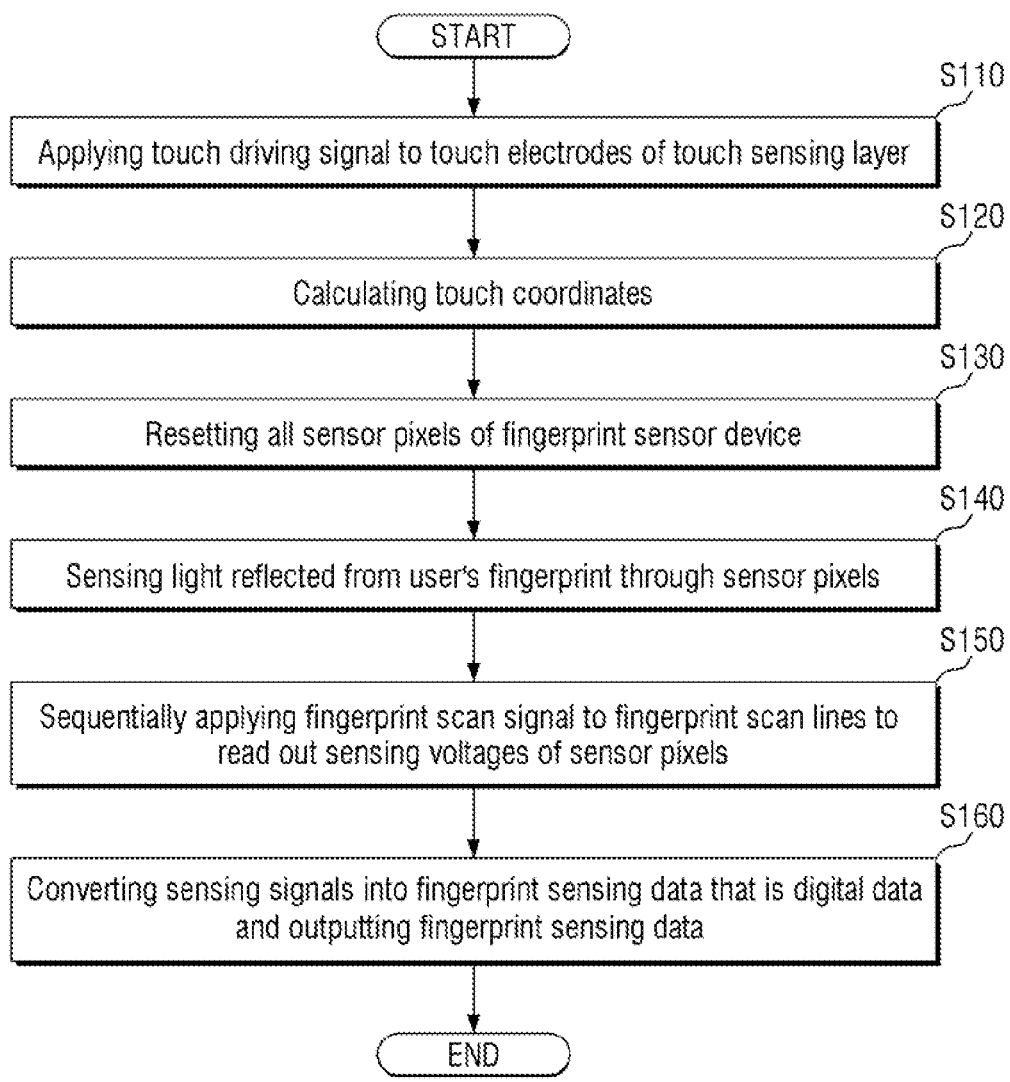
FIG. 14 is a flowchart showing a method for driving a fingerprint sensor device according to an embodiment of the disclosure.
Figure 15:
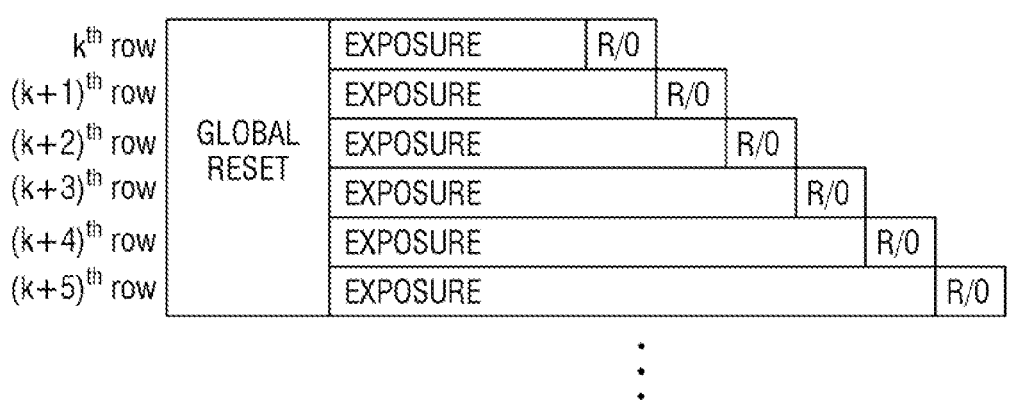

FIG. 14 is a flowchart showing a method for driving a fingerprint sensor device according to an embodiment of the disclosure. FIG. 15 illustrates a reset period, a light exposure period, and a readout period of a fingerprint sensor device according to an embodiment of the disclosure.

First, as shown in FIG. 4, the touch driving circuit 330 applies touch driving signals to the driving electrodes TE of the touch sensing layer TSL of the display panel 300, and senses the charge variation amount of the mutual capacitance of the touch node TN formed at each of the intersections of the driving electrodes TE and the sensing electrodes RE.

Figure 16:
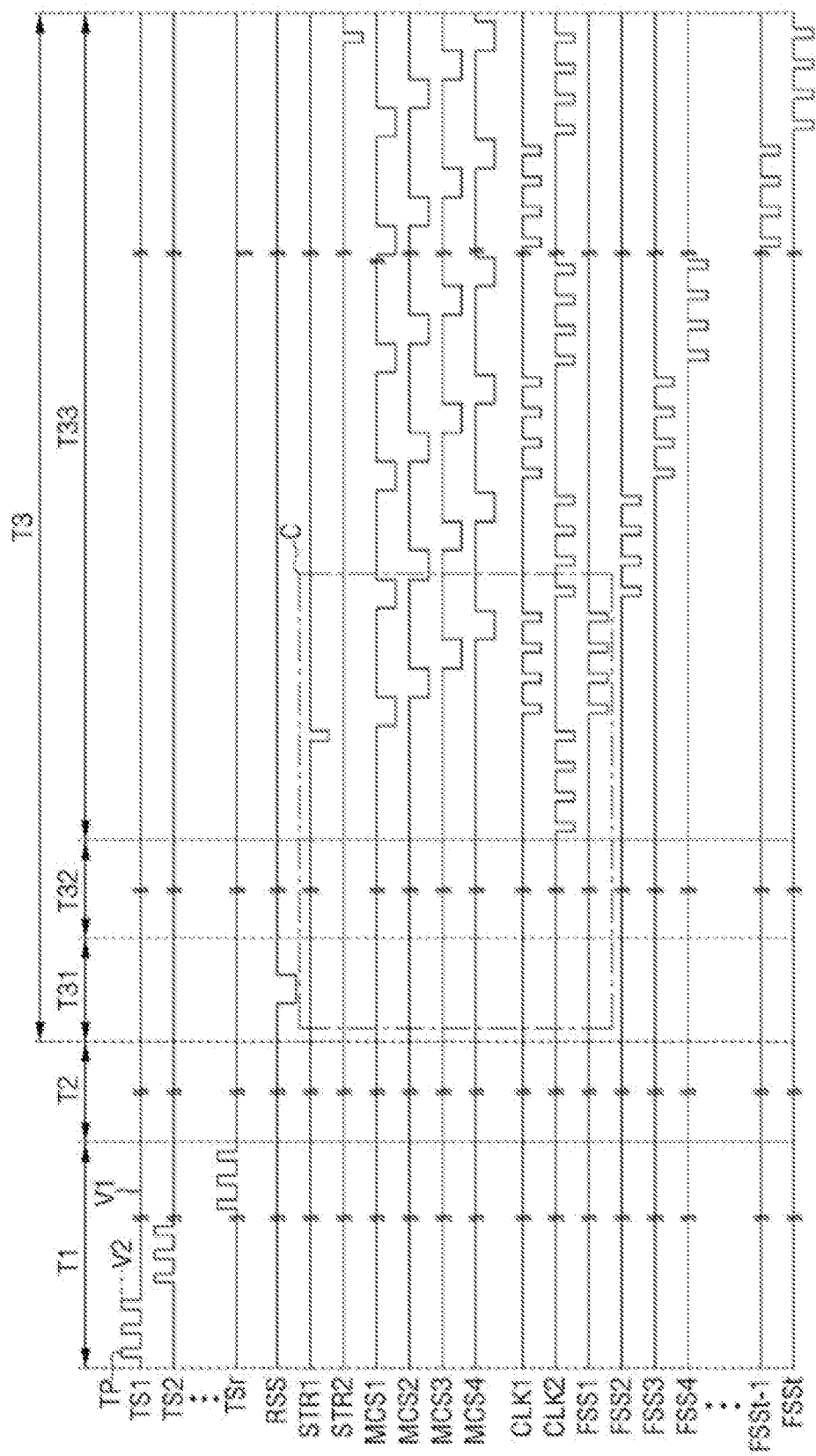
FIG. 16 is a waveform diagram showing touch driving signals, a fingerprint reset signal, start signals, multiplexer control signals, clock signals, and fingerprint scan signals during a touch sensing period, a touch coordinate calculation period, and a fingerprint sensing period according to an embodiment of the disclosure.

The touch driving circuit 330 may generate touch driving signals TS1, TS2 (see FIG. 16) having a plurality of pulses TP (see FIG. 16). Each of the plurality of pulses TP (see FIG. 16) may have a voltage waveform rising from a first level voltage V1 to a second level voltage V2 (step S110 in FIG. 14). For example, the method includes applying touch driving signals to touch electrodes of the touch sensing layer (step S110).

Second, the touch driving circuit 330 may convert the charge variation amount of the mutual capacitance sensed at each of the touch nodes TN into touch data that is digital data, and analyze the touch data to calculate touch coordinates where the touch occurs (step S120 in FIG. 14). For example, the method further includes calculating the touch coordinates in response to applying the touch driving signals (step 120).

Third, all the sensor pixels SEP of the fingerprint sensor device 400 may be reset. (GLOBAL RESET in FIG. 15) That is, the sensor pixels SEP of the fingerprint sensor device 400 may be reset simultaneously. During the reset period (GLOBAL RESET) of the sensor pixels SEP of the fingerprint sensor device 400, the fingerprint reset driver 402 may simultaneously apply a fingerprint reset signal FRCS to the reset driving lines RSL. Accordingly, the voltage of the first electrode of the sensing capacitor RC of each of the sensor pixels SEP of the fingerprint sensor device 400 may be reset or initialized to the reset voltage Vrst (step S130 in FIG. 14). For example, the method further includes resetting all the sensor pixels SEP after calculating the touch coordinates (step S130).

Fourth, the sensor pixels SEP of the fingerprint sensor device 400 sense the light reflected from a user's fingerprint (EXPOSURE in FIG. 15) (step S140).

During the light exposure period (EXPOSURE of FIG. 15) of the sensor pixels SEP of the fingerprint sensor device 400, the light outputted from the display panel 300 may be reflected by the ridge RID and the valley VAL of the fingerprint of the finger F. In an embodiment, the amount of light reflected by the ridge RID of the fingerprint of the finger F and the amount of light reflected by the valley VAL of the fingerprint of the finger F are different. Since the amount of light reflected by the ridge RID of the fingerprint of the finger F and the amount of light reflected by the valley VAL of the fingerprint of the finger F are different, the sensing current flowing through the photodetector PD of the sensor pixel SEP may be different depending on whether the light is reflected by the ridge RID of the fingerprint of the finger F or by the valley VAL of the fingerprint of the finger F (step S140 in FIG. 14).

Fifth, the fingerprint scan signal is sequentially applied to the fingerprint scan lines FSL of the fingerprint sensor block FSB to read out the sensing voltages of the sensor pixels SEP (step S150).

The touch driving circuit 330 may calculate fingerprint data of the fingerprint sensor block FSB among the plurality of unit blocks UB of the fingerprint sensor device 400 as shown in FIGS. 7 and 8 based on the touch coordinates.

The touch driving circuit 330 may generate the demultiplexer control signal DMCS based on the position of the fingerprint sensor block FSB. For example, when the fingerprint sensor block FSB includes 4×4 unit blocks UB as shown in FIG. 8, the demultiplexer control signal DMSC may be generated to output the start signals STR1, STR2, STR3, and STR4 (see FIG. 9) to the start stage SST of each of the unit blocks UB in the first to fourth rows.

The demultiplexer 430 may output the start signals STR1, STR2, STR3, and STR4 (see FIG. 9) to the start stage SST of each of the unit blocks UB in the first to fourth rows in response to the demultiplexer control signal DMCS as shown in FIG. 9. That is, the demultiplexer 430 may output the first start signal STR1 to the start stage SST of the unit blocks UB in the first row, and may output the second start signal STR2 to the start stage SST of the unit blocks UB in the second row. Further, the demultiplexer 430 may output the third start signal STR3 to the start stage SST of the unit blocks UB in the third row, and may output the fourth start signal STR4 to the start stage SST of the unit blocks UB in the fourth row. Accordingly, the fingerprint scan driver 401 may sequentially apply the fingerprint scan signal to the fingerprint scan lines FSL1 to FSLt of each of the unit blocks UB in the first to fourth rows of the fingerprint sensor block FSB.

Further, the touch driving circuit 330 may generate the start signals STR1, STR2, STR3, and STR4 (see FIG. 9) having the same pulse magnitude as that of the touch driving signal TS1, TS2 (see FIG. 16). For example, a pulse SP of the start signals STR1, STR2, STR3, and STR4 (see FIG. 9) may have a voltage waveform falling from the second level voltage V2 to the first level voltage V1. The width of each of a plurality of pulses TP (see FIG. 16) of the touch driving signal TS1, TS2 (see FIG. 16) may be different from or substantially the same as the width of the pulse SP of each of the start signals STR1, STR2, STR3, and STR4 (see FIG. 9).

The multiplexer 403 may connect the fingerprint sensing lines FRL connected to the sensor pixels SEP to the pad lines PDL electrically connected to the fingerprint driving circuit 420 in response to the multiplexer control signals MCS in P (P being an integer of 2 or more):1 correspondence.

The readout circuit 422 may select the pad lines PDL corresponding to the fingerprint sensor block FSB in response to the readout control signal ROC of the fingerprint controller 421. The readout circuit 422 may sense the fingerprint sensing voltages of the selected pad lines PDL.

Since the fingerprint scan driver 401 sequentially applies the fingerprint scan signal to the fingerprint scan lines FSL1 to FSLt of each of the unit blocks UB in the first to fourth rows of the fingerprint sensor block FSB, the readout circuit 422 may sequentially sense the fingerprint sensing voltages of the sensor pixels SEP of the unit blocks UB of the fingerprint sensor block FSB row by row, as shown in FIG. 15. (R/O in FIG. 15) For example, the readout circuit 422 may sense the sensing voltages of the sensor pixels SEP in a $k^{th}$ row (k being a positive integer) of the fingerprint sensor block FSB, and then sense the sensing voltages of the sensor pixels SEP in a $(k+1)^{th}$ row. Further, the readout circuit 422 may sense the sensing voltages of the sensor pixels SEP in a $(k+2)^{th}$ row of the fingerprint sensor block FSB, and then sense the sensing voltages of the sensor pixels SEP in a $(k+3)^{th}$ row. Further, the readout circuit 422 may sense the sensing voltages of the sensor pixels SEP in a $(k+4)^{th}$ row of the fingerprint sensor block FSB, and then sense the sensing voltages of the sensor pixels SEP in a $(k+5)^{th}$ row (step S150 in FIG. 14).

Sixth, the readout circuit 422 may convert the fingerprint sensing voltages sensed by the pad lines PDL into the fingerprint sensing data FDS and output the fingerprint sensing data FDS. The readout circuit 422 may output the fingerprint sensing data FDS to the main processor 710 (step S160 in FIG. 14). For example, the method may include converting the sensing signals into digital fingerprint sensing data FDS and outputting the digital data (step S160).

On the other hand, the touch driving circuit 330 may send the touch coordinate data to the main processor 710, and the main processor 710 may set the fingerprint sensor block FSB of the fingerprint sensor device 400 based on the touch coordinate data to transmit the information on the fingerprint sensor block FSB to the fingerprint driving circuit 420. However, in this embodiment, the time taken from when a user touches the cover window 100 of the display device 10 for fingerprint authentication to when the fingerprint authentication is completed may be increased.

As shown in FIG. 14, the touch driving circuit 330 may calculate the fingerprint sensor block FSB based on the touch coordinate data, and directly apply the start signals STR1, STR2, STR3, and STR4 (see FIG. 9) to the start stage SST of the fingerprint sensor block FSB through the demultiplexer 430. In this embodiment, it is possible to omit the process in which the touch driving circuit 330 sends the touch coordinate data to the main processor 710 and the main processor 710 sets the fingerprint sensor block FSB of the fingerprint sensor device 400 based on the touch coordinate data to transmit the information on the fingerprint sensor block FSB to the fingerprint driving circuit 420. Therefore, it is possible to considerably reduce the time from when a user touches the cover window 100 of the display device 10 for fingerprint authentication to when the fingerprint authentication is completed.

Further, when the fingerprint driving circuit 420 generates the start signals based on the information on the fingerprint sensor block FSB of the main processor 710 and applies the start signals to the start stage SST of the fingerprint sensor block FSB, the fingerprint driving circuit 420 includes bumps connected to the start stage SST of each of the plurality of unit blocks UB. For example, when the fingerprint sensor device 400 includes M×N unit blocks UB, the fingerprint driving circuit 420 includes N bumps.

As shown in FIG. 14, when the touch driving circuit 330 directly applies the start signal STR to the start stage SST of the fingerprint sensor block FSB through the demultiplexer 430, the N bumps connected to the start stage SST of each of the plurality of unit blocks UB may be omitted in the fingerprint driving circuit 420. Instead, bumps for outputting the demultiplexer control signal DMCS and the start signals STR1, STR2, STR3, and STR4 are added to the touch driving circuit 330. Therefore, the area of the fingerprint driving circuit 420 can be reduced, which makes it possible to reduce the manufacturing cost due to the fingerprint driving circuit 420.

Figure 17:
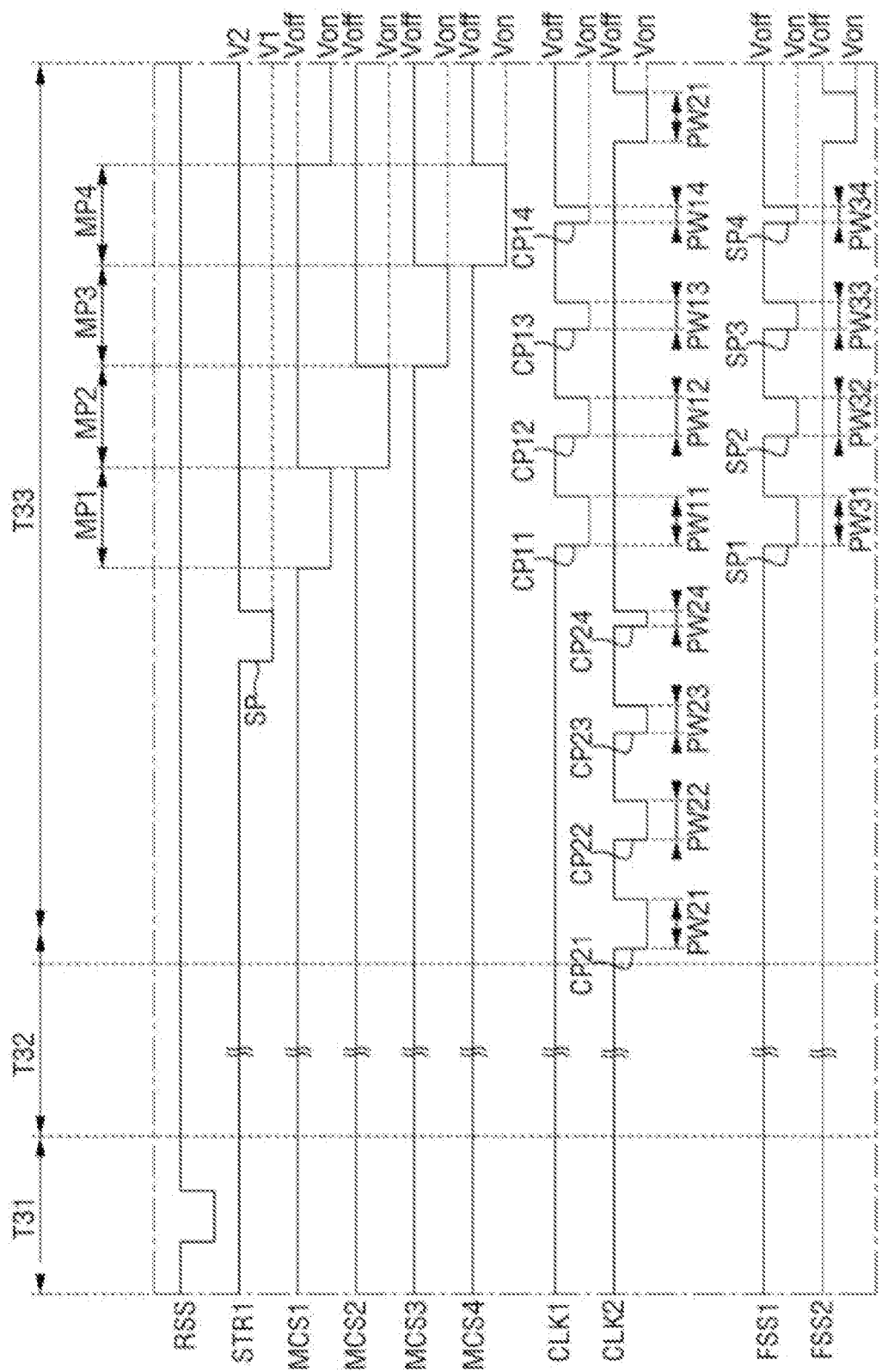
FIG. 17 is a waveform diagram showing area C of FIG. 14 according to an embodiment of the disclosure.

FIG. 16 is a waveform diagram showing the touch driving signals, the fingerprint reset signal, the start signals, the multiplexer control signals, the clock signals, and the fingerprint scan signals during a touch sensing period, a touch coordinate calculation period, and a fingerprint sensing period according to an embodiment of the disclosure. FIG. 17 is a waveform diagram showing area C of FIG. 16 in detail.

FIG. 16 shows a first touch driving signal TS1, a second touch driving signal TS2, an $R^{th}$ touch driving signal TSr, the fingerprint reset signal RSS, the first start signal STR1, the second start signal STR2, a first multiplexer control signal MCS1, a second multiplexer control signal MCS2, a third multiplexer control signal MCS4, a fourth multiplexer control signal MCS4, the first clock signal CLK1, the second clock signal CLK2, a first fingerprint scan signal FSS1, a second fingerprint scan signal FSS2, a third fingerprint scan signal FSS3, a fourth fingerprint scan signal FSS4, a $(T-1)^{th}$ fingerprint scan signal FSSt-1, and a $T^{th}$ fingerprint scan signal FSSt during a touch driving period T1, a touch coordinate calculation period T2, a reset period T31 of the fingerprint sensing period T3, a light exposure period T32, and a readout period T33.

Here, when the fingerprint sensor block FSB includes 4×4 unit blocks UB as shown in FIG. 8, the first to $T^{th}$ fingerprint scan signals FSS1 to FSSt indicate the fingerprint scan signals applied to the first to $T^{th}$ fingerprint scan lines FSL1 to FSLt arranged in the unit blocks UB in the first row. The first start signal STR1 indicates the start signal applied to the start stage SST of the unit blocks UB in the first row, and the second start signal STR2 indicates the start signal applied to the start stage SST of the unit blocks UB in the second row. Referring to FIG. 16, the touch driving period T1 may correspond to step S110 of FIG. 14, the touch coordinate calculation period T2 may corresponds to step S120 of FIG. 14, the reset period T31 may correspond to step S130 of FIG. 14, the light exposure period T32 may correspond to step S140 of FIG. 14, and the readout period T33 may correspond to step S150 of FIG. 14.

The first touch driving signal TS1 may be the signal applied to the first touch driving line TL1 and the second touch driving line TL2 connected to the driving electrodes TE in the first column in FIG. 4. The second touch driving signal TS2 may be the signal applied to the first touch driving line TL1 and the second touch driving line TL2 connected to the driving electrodes TE in the second column in FIG. 4. The $R^{th}$ touch driving signal TSr may be the signal applied to the first touch driving line TL1 and the second touch driving line TL2 connected to the driving electrodes TE in an $r^{th}$ column in FIG. 4. The driving electrodes TE in the first column indicate the driving electrodes TE arranged at the leftmost side of the touch sensing area TSA, and the driving electrodes TE in the $r^{th}$ column indicate the driving electrodes TE arranged at the rightmost side of the touch sensing area TSA.

During the touch driving period T1, the touch driving circuit 330 may sequentially apply the touch driving signals TS1, TS2, and TSr. For example, the touch driving circuit 330 may apply the first touch driving signal TS1 to the driving electrodes TE in the first column, may apply the second touch driving signal TS2 to the driving electrodes TE in the second column, and may apply the $R^{th}$ touch driving signal TSr to the driving electrodes TE in the $r^{th}$ column.

The touch driving circuit 330 may sense the charge variation amount of the mutual capacitance of the touch node TN formed at each of the intersections of the driving electrodes TE in the first column and the sensing electrodes RE in the first row through the touch sensing lines RL during the period in which the first touch driving signal TS1 is applied to the driving electrodes TE in the first column. The touch driving circuit 330 may sense the charge variation amount of the mutual capacitance of the touch node TN formed at each of the intersections of the driving electrodes TE in the second row and the sensing electrodes RE in the second column through the touch sensing lines RL during the period in which the second touch driving signal TS2 is applied to the driving electrodes TE in the second column. The touch driving circuit 330 may sense the charge variation amount of the mutual capacitance of the touch node TN formed at each of the intersections of the driving electrodes TE in the $r^{th}$ column and the sensing electrodes RE in the $r^{th}$ column through the touch sensing lines RL during the period in which the $R^{th}$ touch driving signal TSr is applied to the driving electrodes TE in the $r^{th}$ column.

During the touch coordinate calculation period T2, the touch driving circuit 330 may convert the charge variation amount of the mutual capacitance sensed at each of the touch nodes TN of the touch sensing area TSA to touch data having a digital format, and analyze the touch data to calculate the touch coordinates where the touch occurs.

During the reset period T31, the fingerprint driving circuit 420 may output the fingerprint reset control signal FRCS to the fingerprint reset driver 402. The fingerprint reset driver 402 may simultaneously apply the fingerprint reset signal RSS to the fingerprint reset lines RSL in response to the fingerprint reset control signal FRCS.

When the fingerprint reset signal RSS is applied, the third sensing transistor RT3 of each of the sensor pixels SEP may be turned on as shown in FIG. 10. Therefore, the voltage of the first electrode of the sensing capacitor RC may be reset or initialized to the reset voltage Vrst.

During the light exposure period T32, the light outputted from the display panel 300 may be reflected by the ridge RID and the valley VAL of the fingerprint of the finger F. The light reflected by the ridge RID and the valley VAL of the fingerprint of the finger F may be incident on the sensor pixels SEP of the fingerprint sensor device 400 while passing through the display panel 300. The photodetector PD of each of the sensor pixels SEP may allow the sensing current Ir to flow depending on the incident light.

During the readout period T33, the first start signal STR1 of the touch driving circuit 330 may be applied to the start terminal SRT of the start stage SST of the unit blocks UB in the first row by the demultiplexer 430. As shown in FIG. 11, the second clock signal CLK2 may be applied to the second clock terminal CT2 of the first stage ST1 corresponding to the start stage SST. Among first to fourth pulses CP21, CP22, CP23, and CP24 of the second clock signal CLK2, the fourth pulse CP24 may overlap the pulse SP of the first start signal STR1 as shown in FIG. 17. Accordingly, the pull-up node Q of the first stage ST1 may have a gate-on voltage Von of the first start signal STR1. Therefore, the pull-up transistor PUT of the first stage ST1 may output the first clock signal CLK1 applied to the first clock terminal CT1 to the first fingerprint scan signal FSS1. The pulse of the second start signal STR2 may overlap the fourth pulse CP24 of the second clock signal CLK2, similarly to the first start signal STR1. However, the pulse of the second start signal STR2 may overlap the fourth pulse CP24 of the second clock signal CLK2 for generating the $T^{th}$ fingerprint scan signal FSSt.

Further, the first fingerprint scan signal FSS1 may be applied as the carry signal to the start terminal SRT of the second stage STA2. The first fingerprint scan signal FSS1 may overlap the first to fourth pulses CP11, CP12, CP13, and CP14 of the first clock signal CLK1 applied to the second clock terminal CT2 of the second stage STA2. Accordingly, the pull-up node Q of the second stage STA2 may have the gate-on voltage Von of the first fingerprint scan signal FSS1. Therefore, the pull-up transistor PUT of the second stage STA2 may output the second clock signal CLK2 applied to the first clock terminal CT1 to the second fingerprint scan signal FSS2.

Since the operations of the third stage STA3 and the fourth stage STA4 are similar to the above-described operations of the first stage STA1 and the second stage STA2, the description thereof will be omitted.

Four sensor pixels SEP adjacent in the first direction (X-axis direction) may be connected to the first fingerprint scan line FSL1. The four sensor pixels SEP adjacent in the first direction (X-axis direction) may be connected to the first fingerprint sensing line FRL1, the second fingerprint sensing line FRL2, and the third fingerprint sensing line FRL3, and the fourth fingerprint sensing line FRL4, respectively, as shown in FIG. 13.

During a first multiplexing period MP1, the second sensing transistor RT2 of the sensor pixel SEP connected to the first fingerprint scan line FSL1 and the first fingerprint sensing line FRL1 is turned on by the gate-on voltage Von, so that the first fingerprint sensing line FRL1 may have the sensing voltage due to the sensing current Ir of the sensor pixel SEP. During the first multiplexing period MP1, the first multiplexer transistor MST1 is turned on by the first multiplexer control signal MCS1, so that the sensor pixel SEP connected to the first fingerprint scan line FSL1 and the first fingerprint sensing line FRL1 may be connected to the first pad line PDL1. That is, during the first multiplexing period MP1, the sensing voltage of the first fingerprint sensing line FRL1 may be applied to the first pad line PDL1.

During a second multiplexing period MP2, the second sensing transistor RT2 of the sensor pixel SEP connected to the first fingerprint scan line FSL1 and the second fingerprint sensing line FRL2 is turned on by the gate-on voltage Von, the second fingerprint sensing line FRL2 may have the sensing voltage due to the sensing current Ir of the sensor pixel SEP. During the second multiplexing period MP2, the second multiplexer transistor MST2 is turned on by the second multiplexer control signal MCS2, so that the sensor pixel SEP connected to the first fingerprint scan line FSL1 and the second fingerprint sensing line FRL2 may be connected to the first pad line PDL1. That is, during the second multiplexing period MP2, the sensing voltage of the second fingerprint sensing line FRL2 may be applied to the first pad line PDL1.

During the first multiplexing period MP1, the second sensing transistor RT2 of the sensor pixel SEP connected to the first fingerprint scan line FSL1 and the first fingerprint sensing line FRL1 is turned on by the gate-on voltage Von, so that the first fingerprint sensing line FRL1 may have the sensing voltage due to the sensing current Ir of the sensor pixel SEP. During the first multiplexing period MP1, the first multiplexer transistor MST1 is turned on by the first multiplexer control signal MCS1, so that the sensor pixel SEP connected to the first fingerprint scan line FSL1 and the first fingerprint sensing line FRL1 may be connected to the first pad line PDL1. That is, during the first multiplexing period MP1, the sensing voltage of the first fingerprint sensing line FRL1 may be applied to the first pad line PDL1.

During the second multiplexing period MP2, the second sensing transistor RT2 of the sensor pixel SEP connected to the first fingerprint scan line FSL1 and the second fingerprint sensing line FRL2 is turned on by the gate-on voltage Von, so that the second fingerprint sensing line FRL2 may have the sensing voltage due to the sensing current Ir of the sensor pixel SEP. During the second multiplexing period MP2, the second multiplexer transistor MST2 is turned on by the second multiplexer control signal MCS2, so that the sensor pixel SEP connected to the first fingerprint scan line FSL1 and the second fingerprint sensing line FRL2 may be connected to the first pad line PDL1. That is, during the second multiplexing period MP2, the sensing voltage of the second fingerprint sensing line FRL2 may be applied to the first pad line PDL1.

During a third multiplexing period MP3, the second sensing transistor RT2 of the sensor pixel SEP connected to the first fingerprint scan line FSL1 and the third fingerprint sensing line FRL3 is turned on by the gate-on voltage Von, so that the third fingerprint sensing line FRL3 may have the sensing voltage due to the sensing current Ir of the sensor pixel SEP. During the third multiplexing period MP3, the third multiplexer transistor MST3 is turned on by the third multiplexer control signal MCS3, so that the sensor pixel SEP connected to the first fingerprint scan line FSL1 and the third fingerprint sensing line FRL3 may be connected to the first pad line PDL1. That is, during the third multiplexing period MP3, the sensing voltage of the third fingerprint sensing line FRL3 may be applied to the first pad line PDL1.

During the fourth multiplexing period MP4, the second sensing transistor RT2 of the sensor pixel SEP connected to the first fingerprint scan line FSL1 and the fourth fingerprint sensing line FRL4 is turned on by the gate-on voltage Von, so that the fourth fingerprint sensing line FRL4 may have the sensing voltage due to the sensing current Ir of the sensor pixel SEP. During the fourth multiplexing period MP4, the fourth multiplexer transistor MST4 is turned on by the fourth multiplexer control signal MCS4, so that the sensor pixel SEP connected to the first fingerprint scan line FSL1 and the fourth fingerprint sensing line FRL4 may be connected to the first pad line PDL1. That is, during the fourth multiplexing period MP4, the sensing voltage of the fourth fingerprint sensing line FRL4 may be applied to the first pad line PDL1.

Each of the fingerprint scan signals FSS1 to FSSt may include a plurality of pulses SP1, SP2, SP3, and SP4. The plurality of pulses SP1, SP2, SP3, and SP4 of each of the fingerprint scan signals FSS1 to FSSt may overlap the pulses of the multiplexer control signals MCS1, MCS2, MCS3, and MCS4, respectively. For example, the first pulse SP1 of each of the fingerprint scan signals FSS1 to FSSt may overlap the pulse of the first multiplexer control signal MCS1, and the second pulse SP2 of each of the fingerprint scan signals FSS1 to FSSt may overlap the pulse of the second multiplexer control signal MCS2. The third pulse SP3 of each of the fingerprint scan signals FSS1 to FSSt may overlap the pulse of the third multiplexer control signal MCS3, and the fourth pulse SP4 of each of the fingerprint scan signals FSS1 to FSSt may overlap the pulse of the fourth multiplexer control signal MCS4.

On the other hand, the hysteresis characteristics of the second sensing transistor RT2 of the sensor pixel SEP may be different among the embodiment where the second sensing transistor RT2 is turned-on by the first pulse SP1 of each of the fingerprint scan signals FSS1 to FSSt, the embodiment where it is turned-on by the second pulse SP2, the embodiment where it is turned-on by the third pulse SP3, and the embodiment where it is turned-on by the fourth pulse SP4. That is, the source-drain current curve of the second sensing transistor RT2 of the sensor pixel SEP may be different among the embodiment where the second sensing transistor RT2 is turned-on by the first pulse SP1 of each of the fingerprint scan signals FSS1 to FSSt, the embodiment where it is turned-on by the second pulse SP2, the embodiment where it is turned-on by the third pulse SP3, and the embodiment where it is turned-on by the fourth pulse SP4.

For example, the source-drain current curve of the second sensing transistor RT2 of the sensor pixel SEP may be positively shifted when the second sensing transistor RT2 is turned-on by the second pulse SP2 of each of the fingerprint scan signals FSS1 to FSSt compared to when it is turned-on by the first pulse SP1. Further, the source-drain current curve of the second sensing transistor RT2 of the sensor pixel SEP may be positively shifted when the second sensing transistor RT2 is turned-on by the third pulse SP3 of each of the fingerprint scan signals FSS1 to FSSt compared to when it is turned-on by the second pulse SP2. Further, the source-drain current curve of the second sensing transistor RT2 of the sensor pixel SEP may be positively shifted when the second sensing transistor RT2 is turned-on by the fourth pulse SP4 of each of the fingerprint scan signals FSS1 to FSSt compared to when it is turned-on by the third pulse SP3.

Accordingly, even if the sensing voltage of the sensor pixel SEP connected to a first fingerprint sensing line FRL1 that is sensed during the first multiplexing period MP1 is substantially the same as the sensing voltage of the sensor pixel SEP connected to a second fingerprint sensing line FRL2 that is sensed during the second multiplexing period MP2, the sensing voltage of the first multiplexing period MP1 may be smaller than the sensing voltage of the second multiplexing period MP2. Further, even if the sensing voltage of the second multiplexing period MP2 is substantially the same as the sensing voltage of the sensor pixel SEP connected to a third fingerprint sensing line FRL3 that is sensed during the third multiplexing period MP3, the sensing voltage of the second multiplexing period MP2 may be smaller than the sensing voltage of the third multiplexing period MP3. Furthermore, even if the sensing voltage of the third multiplexing period MP3 is substantially the same as the sensing voltage of the sensor pixel SEP connected to a fourth fingerprint sensing line FRL4 sensed during the fourth multiplexing period MP4, the sensing voltage of the third multiplexing period MP3 may be smaller than the sensing voltage of the fourth multiplexing period MP4.

As shown in FIG. 17, the first pulse CP11 of the first clock signal CLK1 may overlap the pulse of the first multiplexer control signal MCS1, and the second pulse CP12 of the first clock signal CLK1 may overlap the pulse of the multiplexer control signal MCS2. The third pulse CP13 of the first clock signal CLK1 may overlap the pulse of the third multiplexer control signal MCS3, and the fourth pulse CP14 of the first clock signal CLK1 may overlap the pulse of the fourth multiplexer control signal MCS4. The first pulse CP21 of the second clock signal CLK2 may overlap the pulse of the first multiplexer control signal MCS1, and the second pulse CP22 of the second clock signal CLK2 may overlap the pulse of the second multiplexer control signal MCS2. The third pulse CP23 of the second clock signal CLK2 may overlap the pulse of the third multiplexer control signal MCS3, and the fourth pulse CP24 of the second clock signal CLK2 may overlap the pulse of the fourth multiplexer control signal MCS4.

In an embodiment, the first pulse CP11 of the first clock signal CLK1 has a largest width PW11, the second pulse CP12 has a second largest width PW12, the third pulse CP13 has a third largest width PW13, and the fourth pulse CP4 has a smallest width PW14. In an embodiment, the first pulse CP21 of the second clock signal CLK2 has a largest width PW21, the second pulse CP22 has a second largest width PW22, the third pulse CP23 has a third largest width PW23, and the fourth pulse CP24 has a smallest width PW24. Accordingly, the first pulse SP1 of each of the fingerprint scan signals FSS1 to FSSt may have a largest width PW31, the second pulse SP2 may have a second largest width PW32, the third pulse SP3 may have a third largest width PW33, and the fourth pulse SP4 may have a smallest width PW34.

Accordingly, the turn-on period of the second sensing transistor RT2 of the sensor pixel SEP connected to the first fingerprint sensing line FRL1 during the first multiplexing period MP1 may be longer than the turn-on period of the second sensing transistor RT2 of the sensor pixel SEP connected to the second fingerprint sensing line FRL2 during the second multiplexing period MP2. Therefore, the duration in which the sensing current Ir flows toward the first fingerprint sensing line FRL1 during the first multiplexing period MP1 may be longer than the duration in which the sensing current IR flows toward the second fingerprint sensing line FRL2 during the second multiplexing period MP2. Therefore, it is possible to reduce or prevent the difference between the sensing voltage of the first fingerprint sensing line FRL1 and the sensing voltage of the second fingerprint sensing line FRL2 due to the hysteresis characteristics of the second sensing transistor RT2.

Further, the turn-on period of the second sensing transistor RT2 of the sensor pixel SEP connected to the second fingerprint sensing line FRL2 during the second multiplexing period MP2 may be longer than the turn-on period of the second sensing transistor RT2 of the sensor pixel SEP connected to the third fingerprint sensing line FRL3 during the third multiplexing period MP3. Therefore, the duration in which the sensing current Ir flows toward the second fingerprint sensing line FRL2 during the second multiplexing period MP2 may be longer than the duration in which the sensing current IR flows toward the third fingerprint sensing line FRL3 during the third multiplexing period MP3. Therefore, it is possible to reduce or prevent the difference between the sensing voltage of the second fingerprint sensing line FRL2 and the sensing voltage of the third fingerprint sensing line FRL3 due to the hysteresis characteristics of the second sensing transistor RT2.

Further, the turn-on period of the second sensing transistor RT2 of the sensor pixel SEP connected to the third fingerprint sensing line FRL3 during the third multiplexing period MP3 may be longer than the turn-on period of the second sensing transistor RT2 of the sensor pixel SEP connected to the fourth fingerprint sensing line FRL4 during the fourth multiplexing period MP4. Therefore, the duration in which the sensing current Ir flows toward the third fingerprint sensing line FRL3 during the third multiplexing period MP3 may be longer than the duration in which the sensing current Ir flows toward the fourth fingerprint sensing line FRL4 during the fourth multiplexing period MP4. Accordingly, it is possible to reduce or prevent the difference between the sensing voltage of the third fingerprint sensing line FRL3 and the sensing voltage of the fourth fingerprint sensing line FRL4 due to the hysteresis characteristics of the second sensing transistor RT2.

Figure 18:
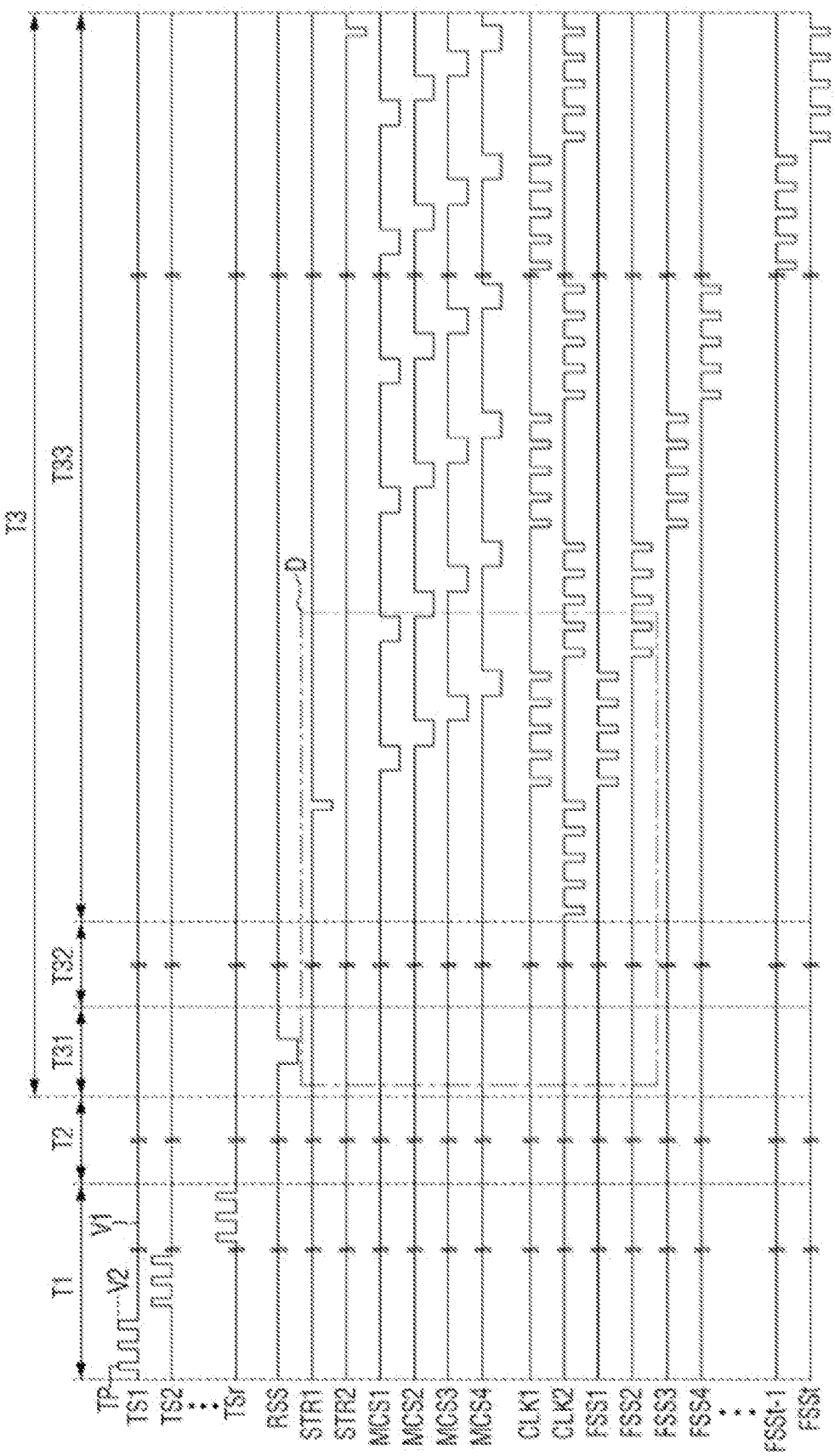
FIG. 18 is a waveform diagram showing the touch driving signals, the fingerprint reset signal, the start signals, the multiplexer control signals, the clock signals, and the fingerprint scan signals during a touch sensing period, a touch coordinate calculation period, and a fingerprint sensing period according to an embodiment of the disclosure.

As shown in FIGS. 17 and 18, the widths of the pulses SP1, SP2, SP3, and SP4 of the fingerprint clock signals FSS1 to FSSt may be different by setting the widths of the pulses CP11, CP12, CP13, and CP14 of the first clock signal CLK1 to be different and setting the widths of the pulses CP21, CP22, CP23, and CP24 of the second clock signal CLK2 to be different. Therefore, it is possible to reduce or prevent the difference between the sensing voltage of the first fingerprint sensing line FRL1 and the sensing voltage of the second fingerprint sensing line FRL2 due to the hysteresis characteristics of the second sensing transistor RT2 of the sensor pixel SEP.

Figure 19:
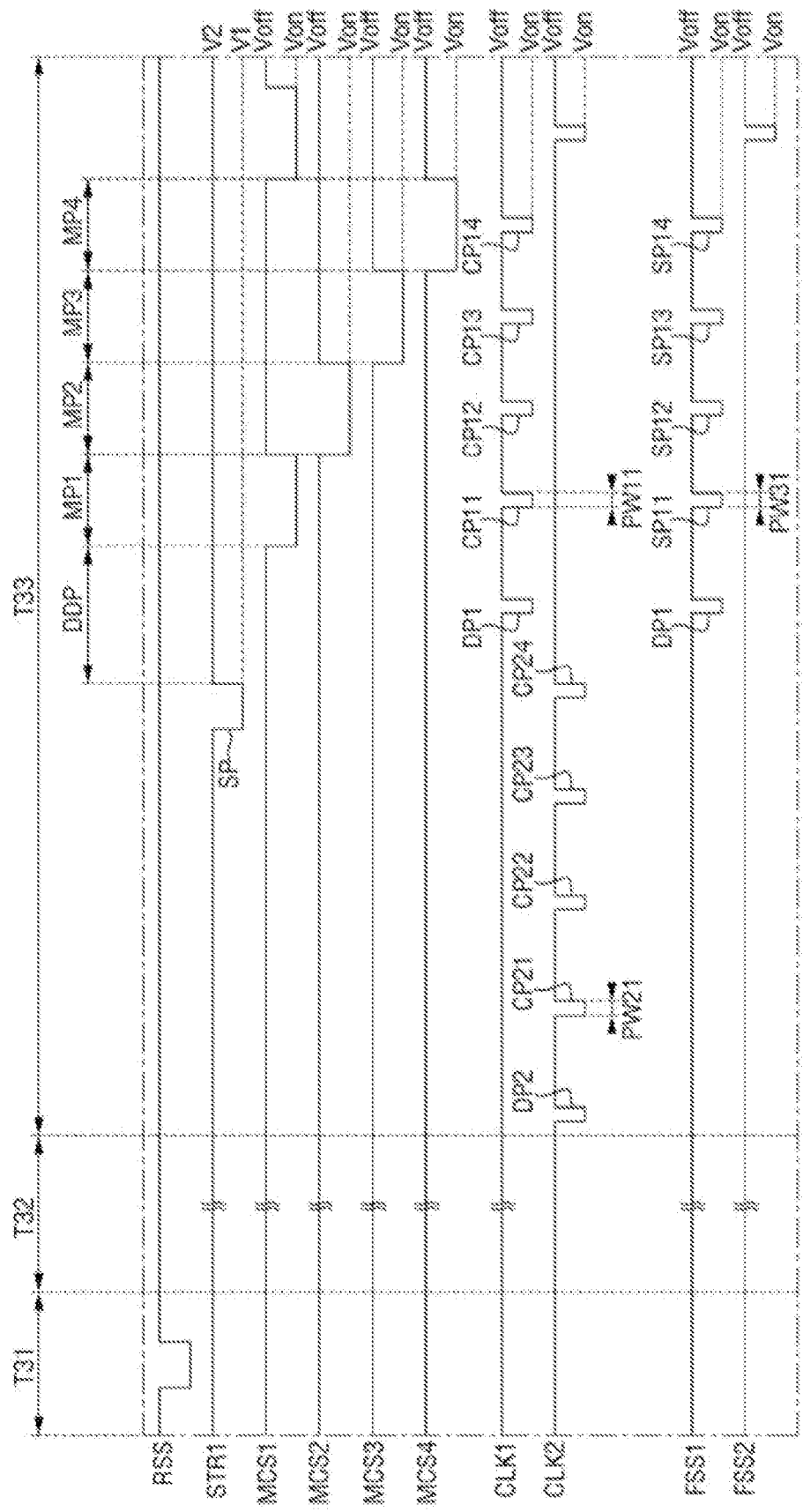
FIG. 19 is a waveform diagram showing area D of FIG. 18 according to an embodiment of the disclosure.

FIG. 18 is a waveform diagram showing the touch driving signals, the fingerprint reset signal, the start signals, the multiplexer control signals, the clock signals, and the fingerprint scan signals during a touch sensing period, a touch coordinate calculation period, and a fingerprint sensing period according to an embodiment of the disclosure. FIG. 19 is a waveform diagram showing area D of FIG. 18 in detail.

The embodiment of FIGS. 18 and 19 is different from the embodiment of FIGS. 16 and 17 in that the first clock signal CLK1 further includes a first dummy pulse DP1 and the second clock signal CLK2 further includes a second dummy pulse DP2. The description being made with reference to FIGS. 18 and 19 is mainly directed to the differences from the embodiment of FIGS. 16 and 17.

Referring to FIGS. 18 and 19, the first clock signal CLK1 may include the first dummy pulse DP1 that is generated during a dummy period DDP preceding the first multiplexing period MP1. The second clock signal CLK2 may include the second dummy pulse DP2 that is generated during a dummy period DDP preceding the first multiplexing period MP1. Accordingly, each of the fingerprint scan signals FSS1 to FSSt may include a dummy pulse generated prior to the first pulse SP1.

During the dummy period DDP in which the dummy pulse is generated, the first multiplexer transistor MST1, the second multiplexer transistor MST2, the third multiplexer transistor MST3, and the fourth multiplexer transistor MST4 are not turned-on. Therefore, even if the second sensing transistor RT2 of the sensor pixel SEP connected to each of the fingerprint sensing lines FRL1, FRL2, FRL3, and FRL4 is turned-on by the dummy pulse DP, the sensing voltage of each of the fingerprint sensing lines FRL1, FRL2, FRL3, and FRL4 is not sensed by the fingerprint driving circuit 420.

The difference in the hysteresis characteristics of the second sensing transistor RT2 of the sensor pixel SEP may be largest between when the second sensing transistor RT2 is turned-on by the first pulse of each fingerprint scan signals FSS1 to FSSt and when it is turned-on by the second pulse. As shown in FIGS. 18 and 19, when each of the fingerprint scan signals FSS1 to FSSt includes a dummy pulse (e.g., DP1), the difference in the hysteresis characteristics of the second sensing transistor RT2 of the sensor pixel SEP between when the second sensing transistor RT2 is turned-on by the first pulse of each of the fingerprint scan signals FSS1 to FSSt and when it is turned-on by the second pulse SP2 may be reduced. That is, it is possible to reduce the difference between the sensing voltage of the first fingerprint sensing line FRL1 and the sensing voltage of the second fingerprint sensing line FRL2 due to the hysteresis characteristics of the second sensing transistor RT2 of the sensor pixel SEP.

In accordance with a fingerprint sensor device, a display device including the same, and a method for driving the display device according to an embodiment, when a touch driving circuit directly applies a start signal to a start stage of a fingerprint sensor block through a demultiplexer, the bumps connected to the start stage of each of a plurality of unit blocks may be omitted in the fingerprint driving circuit. Therefore, the area of the fingerprint driving circuit may be reduced, which makes it possible to reduce the manufacturing cost due to the fingerprint driving circuit.

In accordance with a fingerprint sensor device, a display device including the same, and a method for driving the display device according to an embodiment, the touch driving circuit may calculate a fingerprint sensor block based on touch coordinate data and directly apply the start signal to the start stage of the fingerprint sensor block through the demultiplexer. In this embodiment, it is possible to omit a process in which the touch driving circuit sends the touch coordinate data to a main processor and the main processor sets the fingerprint sensor block of the fingerprint sensor device based on the touch coordinate data to transmit information on the fingerprint sensor block to the fingerprint driving circuit. Therefore, it is possible to considerably reduce the time taken from when a user touches a cover window of the display device for fingerprint authentication to when the fingerprint authentication is completed.

In accordance with a fingerprint sensor device, a display device including the same, and a method for driving the display device according to an embodiment, the widths of the pulses of fingerprint clock signals may be different by setting the widths of the pulses of first clock signals to be different and the widths of the pulses of second clock signals to be different. Therefore, it is possible to reduce or prevent a difference between a sensing voltage of a first fingerprint sensing line and a sensing voltage of a second fingerprint sensing line due to hysteresis characteristics of a second sensing transistor of a sensor pixel.

In accordance with a fingerprint sensing device, a display device including the same, and a method for driving the display device according to an embodiment, when each of fingerprint scan signals includes a dummy pulse, the difference in the hysteresis characteristics of the second sensing transistor of the sensor pixel between when the second sensing transistor is turned on by a first pulse of each of the fingerprint scan signals and when the second sensing transistor is turned on by a second pulse of each of the fingerprint scan signals may be reduced. That is, it is possible to reduce the difference between the sensing voltage of the first fingerprint sensing line and the sensing voltage of the second fingerprint sensing line due to the hysteresis characteristics of the second sensing transistor of the sensor pixel.

However, the effects of embodiments of the present disclosure are not restricted to those set forth herein.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:
1. A display device comprising:
a display panel including a plurality of touch electrodes;
a touch driving circuit electrically connected to the plurality of touch electrodes; and
a fingerprint sensor device disposed on one surface of the display panel and including a plurality of unit blocks,
wherein the fingerprint sensor device comprises:
a plurality of fingerprint scan lines extending in a first direction;
a plurality of fingerprint sensing lines extending in a second direction crossing the first direction;
a plurality of sensor pixels respectively connected to the plurality of fingerprint scan lines and the plurality of fingerprint sensing lines; and
a fingerprint scan driver having a plurality of stages for applying a fingerprint scan signal to each of the plurality of fingerprint scan lines, wherein the stages are arranged into groups,
wherein the touch driving circuit selects some of the unit blocks based on touch coordinates determined from the touch electrodes and applies a start signal to a start stage of one of the groups associated with the selected unit blocks.

2. The display device of claim 1, wherein a magnitude of a pulse of the start signal is equal to a magnitude of a pulse of a touch driving signal applied to the plurality of touch electrodes.

3. The display device of claim 2, wherein the pulse of the touch driving signal rises from a first level voltage to a second level voltage, and the pulse of the start signal falls from the second level voltage to the first level voltage.

4. The display device of claim 1, wherein the touch driving circuit calculates the touch coordinates using the plurality of touch electrodes, and sets a fingerprint sensor block including the selected unit blocks based on the touch coordinates.

5. The display device of claim 1, further comprising:
a demultiplexer disposed between the touch driving circuit and the fingerprint scan driver; and
a plurality of start lines respectively connected to start stages of the plurality of unit blocks,
wherein the demultiplexer applies the start signal to one of the plurality of start lines in response to a demultiplexer control signal of the touch driving circuit.

6. The display device of claim 1, further comprising a fingerprint driving circuit configured to convert sensing voltages of the sensor pixels into fingerprint sensing data of a digital format.

7. The display device of claim 6, further comprising a main processor configured to receive the fingerprint sensing data of the fingerprint driving circuit to authenticate a fingerprint of a user.

8. The display device of claim 6, wherein the fingerprint sensor device further comprises a multiplexer disposed between the plurality of fingerprint sensing lines and the fingerprint driving circuit, and
the multiplexer connects at least two fingerprint sensing lines among the plurality of fingerprint sensing lines to one pad line connected to the fingerprint driving circuit.

9. The display device of claim 8, wherein the multiplexer comprises:
a first multiplexer transistor configured to connect a first fingerprint sensing line among the at least two fingerprint sensing lines to the pad line in response to a first multiplexer control signal;
a second multiplexer transistor configured to connect a second fingerprint sensing line among the at least two fingerprint sensing lines to the pad line in response to a second multiplexer control signal;
a third multiplexer transistor configured to connect a third fingerprint sensing line among the at least two fingerprint sensing lines to the pad line in response to a third multiplexer control signal; and
a fourth multiplexer transistor configured to connect a fourth fingerprint sensing line among the at least two fingerprint sensing lines to the pad line in response to a fourth multiplexer control signal.

10. The display device of claim 9, wherein each of the plurality of stages comprises:
a start terminal to which the start signal or a carry signal is input;
a first clock terminal to which one of a first clock signal of a first clock line and a second clock signal of a second clock line is input and a second clock terminal to which the other one of the first clock signal and the second clock signal is input; and
an output terminal configured to output the fingerprint scan signal.

11. The display device of claim 10, wherein the fingerprint scan signal includes a first pulse overlapping one of pulses of the first multiplexer control signal, a second pulse overlapping one of pulses of the second multiplexer control signal, a third pulse overlapping one of pulses of the third multiplexer control signal, and a fourth pulse overlapping one of pulses of the fourth multiplexer control signal.

12. The display device of claim 11, wherein a first width of the first pulse, a second width of the second pulse, a third width of the third pulse, and a fourth width of the fourth pulse are different.

13. The display device of claim 12, wherein the first width is larger than the second width, the third width, and the fourth width,
the second width is larger than the third width and the fourth width, and
the third width is larger than the fourth width.

14. The display device of claim 11, wherein the fingerprint scan signal further includes a dummy pulse that does not overlap pulses of the first multiplexer control signal, pulses of the second multiplexer control signal, pulses of the third multiplexer control signal, and pulses of the fourth multiplexer control signal.

15. A fingerprint sensor device comprising:
a plurality of fingerprint scan lines extending in a first direction;
a plurality of fingerprint sensing lines extending in a second direction crossing the first direction;
a plurality of sensor pixels respectively connected to the plurality of fingerprint scan lines and the plurality of fingerprint sensing lines;
a fingerprint scan driver having a plurality of stages for applying a fingerprint scan signal to each of the plurality of fingerprint scan lines; and
a multiplexer including N multiplexer transistors for connecting N fingerprint sensing lines among the plurality of fingerprint sensing lines to one pad line,
wherein the N multiplexer transistors are controlled by N multiplexer control signals, and
the fingerprint scan signal includes N pulses overlapping pulses of the N multiplexer control signals,
wherein N is an integer of at least two,
wherein the fingerprint scan signal further includes a dummy pulse that does not overlap the pulses of the N multiplexer control signals.

16. The fingerprint sensor device of claim 15, wherein widths of the N pulses of the fingerprint scan signal are different from each other.

17. A method for driving a display device comprising:
calculating touch coordinates by applying a touch driving signal to a plurality of touch electrodes;
applying, by a fingerprint scan driver, a fingerprint scan signal to fingerprint sensing lines of sensor pixels of a fingerprint sensor block, the fingerprint scan driver having a plurality of stages arranged into groups;
converting sensing signals of the sensor pixels into fingerprint sensing data having a digital format; and
authenticating a fingerprint of a user by comparing a fingerprint pattern generated by the fingerprint sensing data with a pre-stored fingerprint pattern,
wherein the applying of the fingerprint scan signal comprises selecting some unit blocks among a plurality of unit blocks of a fingerprint sensor device based on the touch coordinates and applying a start signal to a start stage of one of the groups associated with the selected unit blocks.

18. The method of claim 17, wherein a pulse of the touch driving signal rises from a first level voltage to a second level voltage, and a pulse of the start signal falls from the second level voltage to the first level voltage.

19. A display device comprising:
a display panel including a plurality of touch electrodes;
a fingerprint sensor device disposed on one surface of the display panel;
a touch driving circuit electrically connected to the plurality of touch electrodes;
a plurality of fingerprint scan lines extending in a first direction;
a plurality of fingerprint sensing lines extending in a second direction crossing the first direction;

a plurality of sensor pixels respectively connected to the plurality of fingerprint scan lines and the plurality of fingerprint sensing lines;

a fingerprint scan driver having a first plurality of stages for applying a first fingerprint scan signal to a first group of the plurality of fingerprint scan lines, and a second plurality of stages for applying a second fingerprint scan signal to a second group of the plurality of fingerprint scan lines; and a demultiplexer, wherein the touch driving circuit applies a first start signal to a first start stage among the first plurality of stages and applies a second start signal to a second start stage among the second plurality of stages through the demultiplexer.

20. The display device of claim 19, wherein a first output of the demultiplexer is directly connected to a first start terminal of the first start stage and a second output of the demultiplexer is directly connected to a second start terminal of the second start stage.

21. The display device of claim 19, wherein an output of the first start stage is connected to a first line of a first group of the fingerprint scan lines and an output of the second start stage is connected to a first line a second other group of the fingerprint scan lines.

22. The method of claim 17, wherein a magnitude of a pulse of the start signal being equal to a magnitude of a pulse of the touch driving signal.

\* \* \* \* \*